United States Patent
Ko et al.

(10) Patent No.: US 12,143,041 B2
(45) Date of Patent: Nov. 12, 2024

(54) MOTOR DRIVING APPARATUS

(71) Applicants: Hyundai Motor Company, Seoul (KR); Kia Corporation, Seoul (KR)

(72) Inventors: Young Kwan Ko, Seoul (KR); Yong Jae Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 153 days.

(21) Appl. No.: 18/098,881

(22) Filed: Jan. 19, 2023

(65) Prior Publication Data
US 2024/0039447 A1  Feb. 1, 2024

(30) Foreign Application Priority Data
Jul. 26, 2022  (KR) .................. 10-2022-0092620

(51) Int. Cl.
| | | |
|---|---|---|
| H02P 27/08 | (2006.01) | |
| H02P 25/22 | (2006.01) | |
| H02P 27/12 | (2006.01) | |
| H02P 27/14 | (2006.01) | |

(52) U.S. Cl.
CPC .............. *H02P 25/22* (2013.01); *H02P 27/12* (2013.01)

(58) Field of Classification Search
CPC .......... H02P 27/14; H02P 25/22; H02P 27/08; H02P 27/12
USPC ........................................................ 318/496
See application file for complete search history.

(56) References Cited

U.S. PATENT DOCUMENTS

| | | | |
|---|---|---|---|
| 2009/0033253 A1 | 2/2009 | Nagashima et al. | |
| 2019/0296670 A1* | 9/2019 | Omata | H02P 21/22 |
| 2019/0296678 A1* | 9/2019 | Omata | H02P 29/50 |
| 2019/0379297 A1* | 12/2019 | Agirman | H02P 27/08 |
| 2020/0177102 A1* | 6/2020 | Mori | H02M 7/53871 |
| 2021/0067080 A1* | 3/2021 | Endo | H02P 6/16 |
| 2022/0144114 A1* | 5/2022 | Bin | B60L 53/22 |

FOREIGN PATENT DOCUMENTS

| | | |
|---|---|---|
| CN | 107196543 A | 9/2017 |
| CN | 108988718 A | 12/2018 |
| CN | 109870639 A | 6/2019 |

(Continued)

OTHER PUBLICATIONS

Jaehyuk Baik, et al. (2020). Remote-State PWM with Minimum RMS Torque Ripple and Reduced Common-Mode Voltage for Three-Phase VSI-Fed BLAC Motor Drives. electronics. 9, 586.

*Primary Examiner* — Gabriel Agared
(74) *Attorney, Agent, or Firm* — Morgan, Lewis & Bockius LLP

(57) ABSTRACT

A motor driving apparatus driving a motor that has a plurality of windings respectively corresponding to a plurality of phases includes a first inverter including a plurality of first switching elements and connected to a first end of each of the windings, a second inverter including a plurality of second switching elements and connected to a second end of each of the windings, and a controller determining a voltage command of the first inverter based on a voltage command of the motor and the active vector corresponding to a duty of the second switching elements and controlling the first switching elements through pulse width modulation based on the voltage command of the first inverter.

14 Claims, 21 Drawing Sheets

(56) References Cited

FOREIGN PATENT DOCUMENTS

| | | |
|---|---|---|
| CN | 111900900 A | 11/2020 |
| JP | 2000-341984 A | 12/2000 |
| JP | 4609102 B2 | 1/2011 |
| JP | 6285256 B2 | 2/2018 |
| JP | 2021-114826 A | 8/2021 |
| KR | 10-2023-0023440 A | 2/2023 |

* cited by examiner

[Synthesized voltage vector]

[First inverter voltage vector]

[Second inverter voltage vector]

[Synthesized voltage vector]

[Second inverter voltage vector]

[First inverter voltage vector]

MOTOR DRIVING APPARATUS

CROSS REFERENCE TO RELATED APPLICATION

The present application claims priority to Korean Patent Application No. 10-2022-0092620, filed on Jul. 26, 2022, the entire contents of which is incorporated herein for all purposes by this reference.

BACKGROUND OF THE PRESENT DISCLOSURE

Field of the Present Disclosure

The present disclosure relates to a motor driving apparatus, and more particularly, to a motor driving apparatus by an open-end winding method of connecting each inverter to either end of the winding of the motor.

Description of Related Art

In general, windings for respective phases included in a motor are connected to an inverter at one end and connected to each other at the other end to form a Y-connection.

When the motor is driven, the switching elements in the inverter are turned on or off by a pulse width modulation and an alternating current is generated by applying a line voltage to the windings of the Y-connected motor to generate torque.

Because the fuel efficiency (or electrical efficiency) of an eco-friendly vehicle such as an electric vehicle that utilizes the torque generated by the motor for power is determined by the efficiency of inverter-motor power conversion, it is important to maximize the power conversion efficiency of the inverter and the efficiency of the motor to improve the fuel efficiency.

The efficiency of the inverter-motor system is mainly determined by the voltage utilization rate of the inverter. The fuel efficiency may be improved when the operating point of the vehicle as determined by the relationship between the motor speed and torque is formed in a section with a high voltage utilization rate.

However, because an increase in the number of windings of the motor to increase the maximum torque of the motor moves the section with a high voltage utilization rate away from the region of low torque which is a major operating point of the vehicle, a problem is that the fuel efficiency may deteriorate. Furthermore, when the main operating point is designed to be in a section with a high voltage utilization rate from the viewpoint of fuel efficiency, a problem is that the acceleration performance of the vehicle may deteriorate caused by the limited maximum torque of the motor.

To resolve the problems, a motor driving technique by an open-end winding (OEW) method of driving two inverters by connecting each inverter to either end of the winding of the motor instead of shorting one end of the winding of the motor has been provided.

The OEW motor driving technique has the advantage of improving voltage utilization rate and allowing high output by increasing the phase voltage compared to driving a motor with a conventional Y-connected structure.

However, the motor driving technique by the OEW method may not control the common mode voltage to produce zero average common mode voltage during an inverter switching period when a common DC power source is applied to inverters respectively connected to either end of the winding of the motor, generating a common mode current. The common mode current may cause loss such as copper loss and iron loss while flowing through the winding of the motor, reducing the motor efficiency, and in severe cases, causing burnout of the motor system.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus configured to improve motor efficiency by setting the duty of the plurality of first switching elements so that the one-period average of common mode voltage matches the voltage command of common mode when the motor is driven by an open-end winding method of connecting each inverter to either end of motor winding to remove common mode voltage and current.

Technical objects to be achieved as an exemplary embodiment of the present disclosure are not limited to the technical objects described above, and other technical objects not described will be clearly understood by those skilled in the art to which an exemplary embodiment of the present disclosure pertains.

According to various exemplary embodiments of the present disclosure for addressing the issue described above, the motor driving apparatus is a motor driving apparatus driving the motor including a plurality of windings respectively corresponding to a plurality of phases and includes a first inverter including a plurality of first switching elements and connected to a first end of each of the windings, a second inverter including a plurality of second switching elements and connected to a second end of each of the windings, and a controller configured for determining the voltage command of the first inverter based on a voltage command of the motor and an active vector corresponding to the duty of the second switching elements and controlling the first switching elements through pulse width modulation based on the voltage command of the first inverter, wherein the controller is configured to determine the active vector including the same common mode voltage as the plurality of second switching elements to be the duty of the plurality of first switching elements in the pulse width modulation of the first switching elements and adjusts the duty of the plurality of first switching elements so that the one-period average of the outputted common mode voltage matches the voltage command of common mode.

For example, the controller may be configured to control the first switching elements through remote state pulse width modulation (RSPWM).

For example, the controller may be configured to control the first switching elements through symmetric RSPWM.

For example, the controller may be configured to determine the voltage command of the first inverter using a plurality of active vectors including the same common mode voltage as the active vector corresponding to the duty of the second switching elements.

For example, the duty of the plurality of first switching elements, the voltage command of the common mode, and DC voltage applied to the first inverter and the second inverter may have a relationship as shown in the following FORMULA 1:

$$\text{Duty}_{vn} = 1/n \times V_n^* / (V_{dc}/n), \quad \text{FORMULA 1:}$$

where $\text{Duty}_{vn}$=duty of a plurality of first switching elements, $V_n^*$=voltage command of the motor, $V_{dc}$=DC voltage applied to the first inverter and the second inverter, and n=number of switching elements forming the first inverter.

For example, the controller may be configured to control the first switching elements through the pulse width modulation by a feed-back control or a feed-forward control.

For example, the controller may be configured to determine the voltage command of the first inverter using a plurality of active vectors including the same common mode voltage as the active vector corresponding to the duty of the second switching elements.

For example, the controller may switch the first switching elements so that a plurality of active vectors including the same common mode voltage as the active vector corresponding to the duty of the second switching elements repeats itself in a fixed order.

For example, the controller may switch the first switching elements so that a plurality of vectors including the same common mode voltage as the active vector corresponding to the duty of the second switching elements appears symmetrically with respect to a midpoint of one switching period.

For example, the controller may switch the first switching elements so that a switching state including the longest duty among a plurality of active vectors including the same common mode voltage as the active vector corresponding to the duty of the second switching elements continuously appears before and after the midpoint.

For example, the controller may be configured to determine an active vector closest to the voltage vector corresponding to the voltage command of the motor to be the duty of the second switching elements.

For example, the controller may be configured to generate a 3-phase voltage command by transforming the voltage command of the motor in reverse rotation and determine the active vector closest to the voltage vector corresponding to the voltage command of the motor to be the duty of the second switching elements based on the 3-phase voltage command.

For example, the controller may be configured to determine the voltage command of the first inverter by adding the result of rotation conversion of the active vector corresponding to the duty of the first switching elements and the active vector corresponding to the duty of the second switching elements to the voltage command of the motor.

For example, the controller may limit the voltage command of the motor to preset upper and lower limits.

According to the various embodiment of the present described above, when the motor is driven by the open-end winding method of connecting each inverter to either end of the motor winding, the motor efficiency may be improved by setting the duty of the plurality of first switching elements so that the one-period average of the common mode voltage matches the voltage command of common mode to remove the common mode voltage and current.

Furthermore, the common mode current may be prevented from distorting the motor phase current, facilitating the control of motor current and preventing loss such as iron loss and copper loss of the motor caused by the circulating current in advance.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
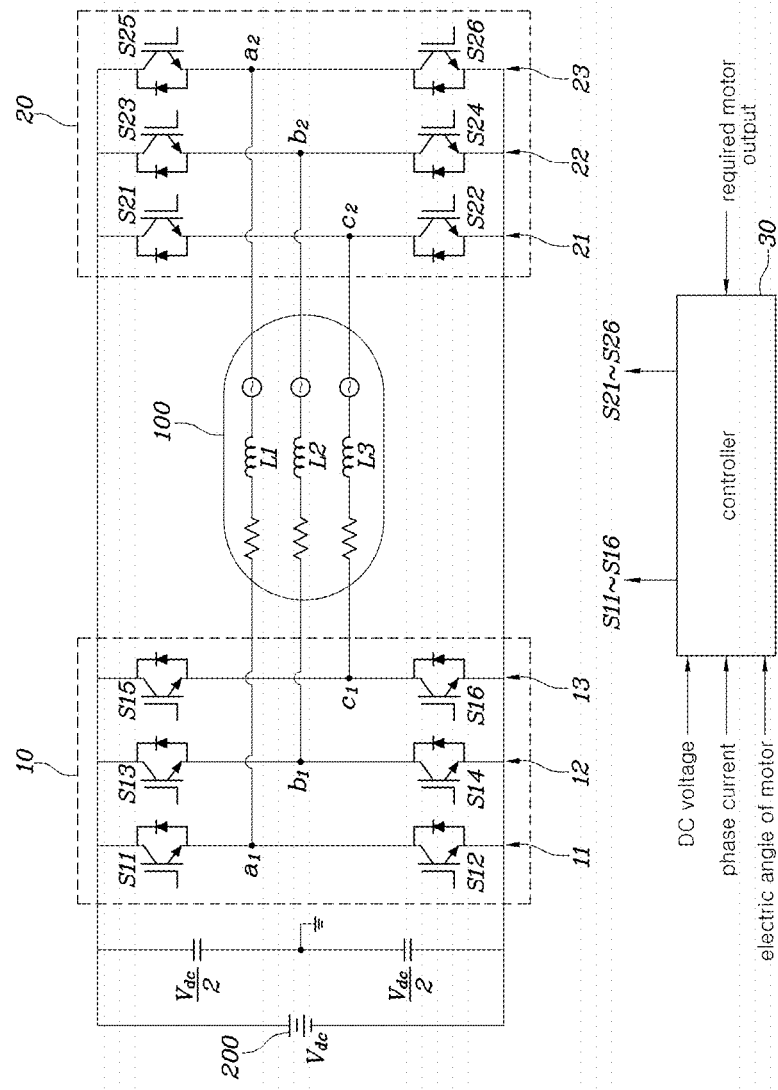
FIG. 1 is a circuit diagram of a motor driving apparatus according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the exemplary embodiments of the present disclosure included in the present specification or application are only illustrative examples for describing the exemplary embodiments according to an exemplary embodiment of the present disclosure. Exemplary embodiments of the present disclosure may be implemented in various forms and are not to be construed as being limited to the exemplary embodiments described in the present specification or application.

Because the exemplary embodiments of the present disclosure may be subject to various modifications and take diverse forms, specific embodiments will be illustrated in the drawings and described in detail in the present specification or application. However, this is not intended to limit the exemplary embodiments according to the concept of the present disclosure to the predetermined included forms, and the exemplary embodiments are to be understood to include all modifications, equivalents or substitutes included in the spirit and scope of the present disclosure.

Unless defined otherwise, all terms used herein, including technical or scientific terms, have the same meaning as generally understood by those having common skill in the art to which an exemplary embodiment of the present disclosure pertains. Terms such as those commonly used and already defined are to be interpreted as having meaning consistent with the meaning in the context of the related art and are not to be interpreted as having an ideal or excessively formal meaning unless explicitly defined in the present specification.

The present disclosure will be described in detail by way of describing exemplary embodiments of the present disclosure with reference to the accompanying drawings in the following.

FIG. 1 is a circuit diagram illustrating a motor driving apparatus according to various exemplary embodiments of the present disclosure.

FIG. 1 shows that the motor driving apparatus according to various exemplary embodiments of the present disclosure is a motor driving apparatus providing driving power to a motor 100 including a plurality of windings L1-L3 corresponding to a plurality of phases and includes a first inverter 10 including a plurality of first switching elements S11-S16 and connected to a first end of each winding of the motor 100, a second inverter 20 including a plurality of second switching elements S21-S26 and connected to a second end of each winding of the motor 100, and a controller 30 controlling the first switching elements S11-S16 and the second switching elements S21-S26 through pulse width modulation based on a required output of the motor 100.

The first inverter 10 and the second inverter 20 may convert the DC power stored in a battery 200 into 3-phase AC power and provide the 3-phase Ac power to the motor 100, or convert regenerative braking energy generated due to the generation of braking torque of the motor 100 into direct current and provide the direct current to the battery 200. Such conversion between the DC power and AC power may be implemented by pulse width modulation (PWM) of the first switching elements S11-S16 and the second switching elements S21-S26 respectively provided in the first inverter 10 and the second inverter 20.

The first inverter 10 may include a plurality of legs 11-13 to which DC voltage is applied. The legs 11-13 may respectively correspond to a plurality of phases of the motor 100 to form an electrical connection. The first leg 11 may include two switching elements S11, S12 connected to each other in series, and the connection node of the two switching elements S11, S12 may be connected to one end of a winding L1 of a phase in the motor 100 so that an alternating current corresponding to a phase among a plurality of phases is inputted and outputted.

Similarly, the second leg 12 may include two switching elements S13, S14 connected to each other in series, and the connection node of the two switching elements S13, S14 may be connected to one end of a winding L2 of a phase in the motor 100 so that an alternating current corresponding to a phase of the plurality of phases is inputted and outputted. Furthermore, the third leg 13 may include two switching elements S15, S16 so that the connection node of the two switching elements S15, S16 may be connected to one end of a winding L3 of the phase of the plurality of phases in the motor 100 so that the alternating current corresponding to one phase among a plurality of phases is inputted and outputted.

The second inverter 20 may also have a configuration similar to that of the first inverter 10. The second inverter 20 may have a plurality of legs 21-23 to which a DC voltage of the battery 200 is applied. The legs 21-23 respectively correspond to a plurality of phases of the motor 100 to form an electrical connection. The first leg 21 may include two switching elements S21, S22 connected to each other in parallel, and the connection node of the two switching elements S21, S22 may be connected to the other end of a winding L1 of a phase in the motor 100 so that the alternating current corresponding to a phase among a plurality of phases of the two switching elements S21, S22 is inputted and outputted.

Similarly, the second leg 22 may include two switching elements S23, S24 connected to each other in parallel, and the connection node of the two switching elements S23, S24 may be connected to the other end of a winding L2 of a phase in the motor 100 so that the alternating current corresponding to a phase among a plurality of phases of the two switching elements S23, S24 is inputted and outputted.

Furthermore, the third leg 23 may include two switching elements S25, S26 connected to each other in parallel, and the connection node of the two switching elements S25, S26 may be connected to the one end of a winding L3 of a phase in the motor 100 so that the alternating current corresponding to a phase among a plurality of phases is inputted and outputted.

The first inverter 10 is connected to one end of the windings L1-L3 of the motor 100, and the second inverter 20 is connected to the other end of the windings L1-L3 of the motor 100. That is, an electrical connection of an open-end winding type in which either end of the windings L1-L3 is respectively connected to the first inverter 10 and the second inverter 20 of the motor 100 may be formed.

The controller 30 is an element configured to control the switching elements S11-S16, S21-S26 included in the first inverter 10 and the second inverter 20 through pulse width modulation so that the motor 100 may be driven based on the required output required for the motor 100.

The controller 30 may drive the motor 100 by switching the first switching elements S11-S16 of the first inverter 10 and the second switching elements S21-S26 of the second inverter 20 through pulse width modulation upon receiving an input of a DC voltage Vdc applied to the first inverter and the second inverter, a phase current detected by a current sensor and provided to the motor 100, and an electric angle of the motor 100 detected by a rotor sensor provided in the motor 100. The controller 30 may apply the space vector pulse width modulation (SVPWM) when controlling the first switching elements S11-S16 of the first inverter 10 and the second switching elements S21-S26 of the second inverter 20.

A technique of controlling a motor driving apparatus of a conventional open-end winding type will be first described to facilitate a clearer understanding of the motor driving apparatus including the above configuration according to various exemplary embodiments of the present disclosure.

Figure 2:
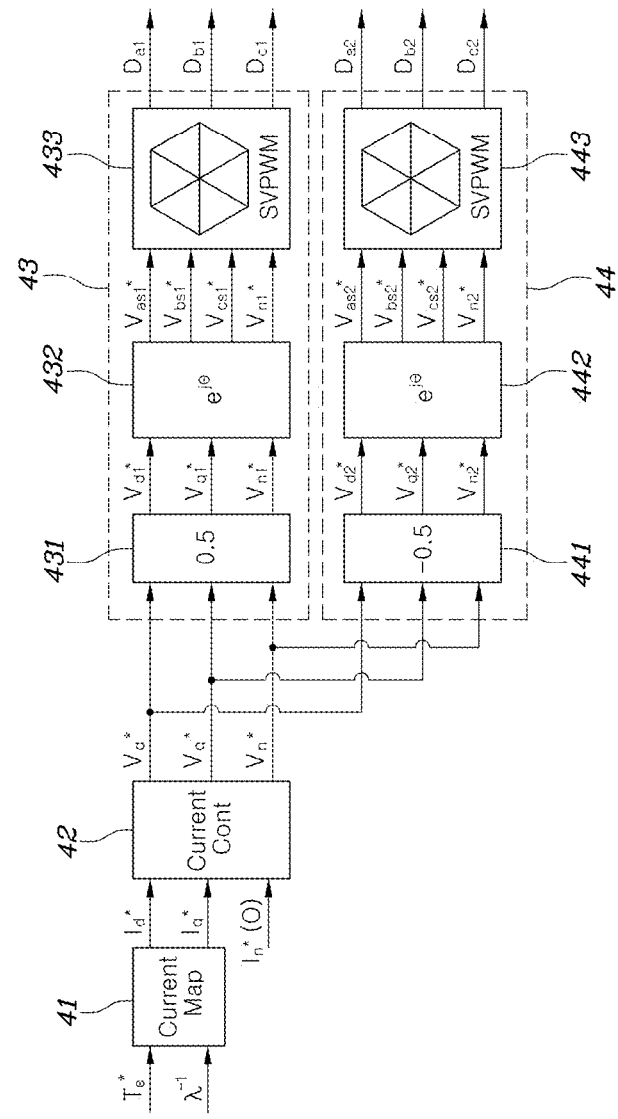
FIG. 2 is a block diagram illustrating in detail a conventional controller for controlling a motor by an open-end winding method.
Figure 3:
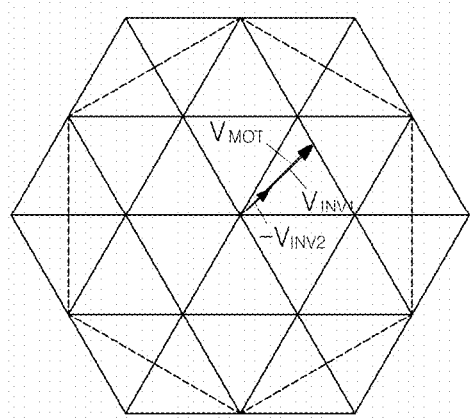
FIG. 3 is a voltage vector diagram for describing a motor control technique applied in a conventional controller illustrated in FIG. 2.
Figure 3:
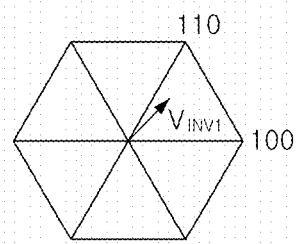
Figure 3:
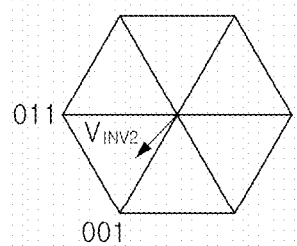
Figure 4:
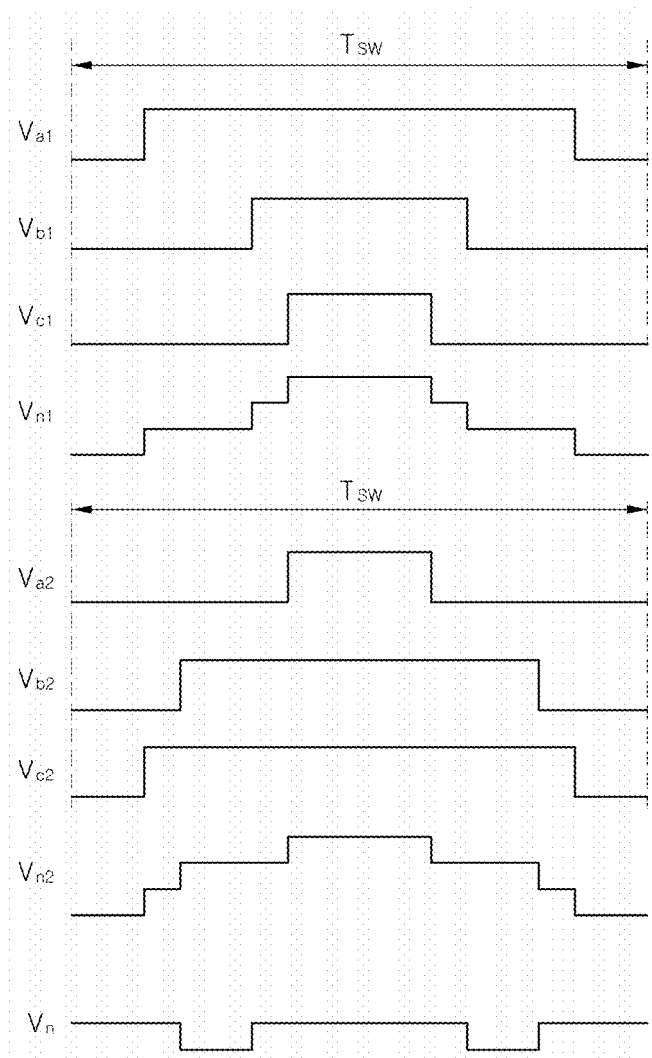
FIG. 4 is a waveform diagram illustrating a voltage output of each inverter generated when a motor is controlled by the conventional controller illustrated in FIG. 2.
Figure 5:
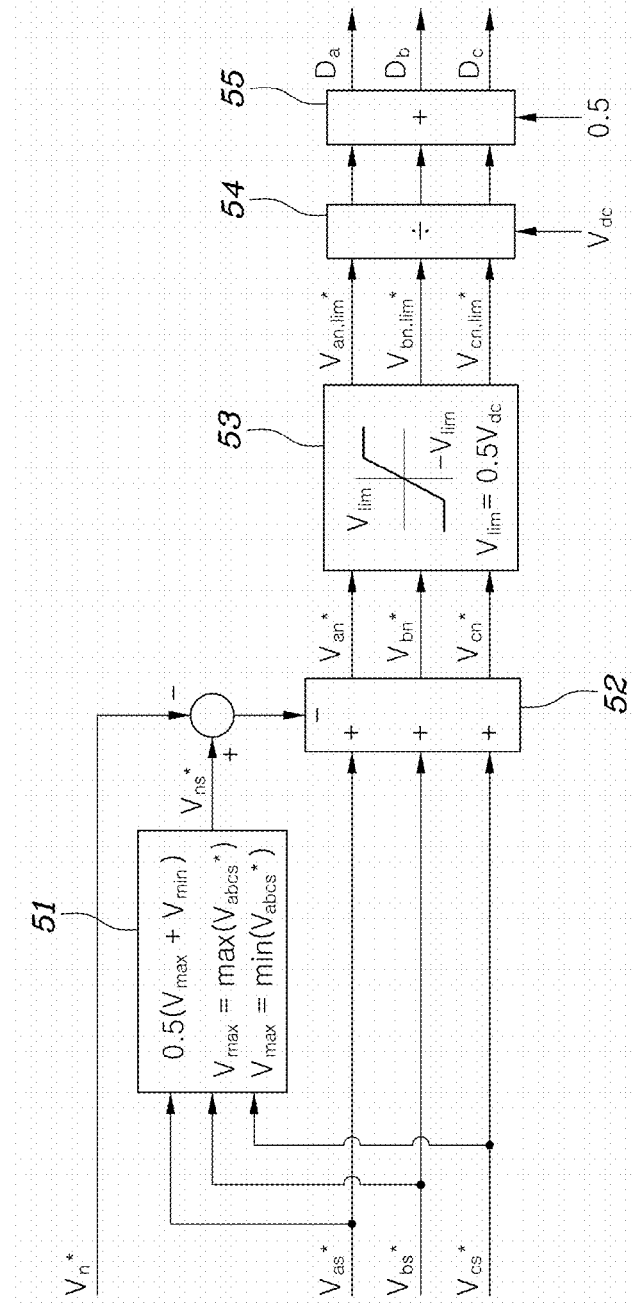
FIG. 5 is a block diagram illustrating in more detail a space vector modulator in the conventional controller illustrated in FIG. 2.

FIG. 2 is a block diagram illustrating in detail a conventional controller for controlling a motor by an open-end winding method, and FIG. 3 is a voltage vector diagram for describing a motor control technique applied in a conventional controller illustrated in FIG. 2. FIG. 4 is a waveform diagram illustrating a voltage output of each inverter generated when a motor is controlled by the conventional controller illustrated in FIG. 2, and FIG. 5 is a block diagram illustrating in more detail a space vector modulator in the conventional controller illustrated in FIG. 2.

As illustrated in FIG. 2, a controller of a conventional motor driving apparatus may include a current command map 41, a current controller 42, a first duty generator 43, and a second duty generator 44.

The current command map may generate a current command $I_d^*$, $I_q^*$ corresponding to the required motor output (required motor torque $T_c^*$, and back electromotive force $\lambda^{-1}$ of the motor) generated by the manipulation of a driver. The current command map 41 generates a current command of the motor reflecting the required motor output. The example of FIG. 2 illustrates a map based on the required motor output and back electromotive force, but a map generating a current command of the motor based on other factors may be applied.

The current controller 42 may receive the current command $I_d^*$, $I_q^*$ and generate voltage command $V_d^*$, $V_q^*$, $V_n^*$ configured to reduce the difference between the received current command and the value obtained by detecting the current actually provided to the motor. The voltage command may include a d-axis component $V_d^*$, a q-axis component $V_q^*$, and a 0-phase component $V_n^*$.

The first duty generator 43 is an element for generating the duty of the switching elements in the first inverter 10 illustrated in FIG. 1 and may include a multiplier 431 multiplying the voltage command $V_d^*$, $V_q^*$, $V_n^*$ by ½ to generate a first inverter voltage command $V_{d1}^*$, $V_{q1}^*$, $V_{n1}^*$ to be applied to the first inverter 10, a coordinate transformer 432 transforming the first inverter voltage command $V_{d1}^*$, $V_{q1}^*$, $V_{n1}^*$ into a first inverter phase voltage command $V_{as1}^*$, $V_{bs1}^*$, $V_{cs1}^*$ corresponding to each phase of the motor, and a first space vector pulse width modulator 433 performing space vector pulse width modulation based on the first inverter phase voltage command $V_{as1}^*$, $V_{bs1}^*$, $V_{cs1}^*$ and the common mode $V_{n1}^*$ among the first inverter voltage commands to generate the duty of the switching element in the first inverter 10.

The second duty generator 44, like the first duty generator 43, is an element for generating the duty of the switching elements in the second inverter 20 illustrated in FIG. 1 and may include a multiplier 441 multiplying the voltage command $V_d^*$, $V_q^*$, $V_n^*$ by -½ to generate a second inverter voltage command $V_{d2}^*$, $V_{q2}^*$, $V_{n2}^*$ to be applied to the second inverter 20, a coordinate transformer 442 transforming the second inverter voltage command $V_{d2}^*$, $V_{q2}^*$, $V_{n2}^*$ into a second inverter phase voltage command $V_{as2}^*$, $V_{bs2}^*$, $V_{cs2}^*$ corresponding to each phase of the motor, and a second space vector pulse width modulator 443 performing space vector pulse width modulation based on a common mode $V_{n2}^*$ among the second inverter phase voltage command $V_{as2}^*$, $V_{bs2}$, $V_{cs2}^*$ and the second inverter voltage command to generate the duty of the switching elements in the second inverter 20.

Here, the coordinate transformation by the coordinate transformers 432, 442 refers to a transformation of dq synchronous coordinates into abc coordinates corresponding to the motor three phases and corresponds to a technique commonly known in the art as Inverse Clarke/Park Transformation. The Clarke/Park Transformation, which is the opposite of the Clarke/Park Transformation, is also known in the art and a separate detailed description thereof will be omitted in the following.

As illustrated in FIG. 2, the voltage command of the motor is equally distributed to the first inverter and the second inverter in the motor control technique of the conventional open-end winding method.

That is, as illustrated in FIG. 3, in the motor control of the open-end winding structure, the motor voltage $V_{MOT}$ shown in the vector diagram obtained by synthesizing the switching vector diagram for the first inverter and the switching vector diagram for the second inverter may be expressed by the difference between the voltage $V_{INV1}$ by the first inverter and the voltage $V_{INV2}$ by the second inverter including the same magnitude as the voltage $V_{INV1}$ by the first inverter in the opposite direction. Each vector diagram is shown on the dq plane. The dq plane and the vector diagram for space vector pulse width modulation are well known in the art, and a separate detailed description thereof will be omitted.

An inverter output voltage waveform illustrated in FIG. 4 may be obtained through the space vector pulse width modulation of the first inverter voltage and the second inverter voltage that have the same magnitude in opposite directions. $T_{sw}$ is a switching period of a switching element in the inverter, $V_{a1}$, $V_{b1}$, $V_{c1}$, $V_{n1}$ denote respective phase voltages and common mode voltage of the first inverter, $V_{a2}$, $V_{b2}, V_{c2}, V_{n2}$ denote respective phase voltages and common mode voltage of the second inverter, and $V_n$ denotes the difference between the common mode voltage of the first inverter and the common mode voltage of the second inverter and denotes the common mode voltage applied to the motor by the first inverter and the second inverter.

As illustrated in FIG. 4, the first inverter voltage and the second inverter voltage have the same magnitude on the dq plane but different phases so that they have different common voltages. Accordingly, the magnitude of the common mode voltage applied to the motor may not be maintained at zero on average during a period.

The space vector modulator 433 or 443 in a conventional controller illustrated in FIG. 2 may include an offset voltage generator 51, a terminal voltage command generator 52, a terminal voltage command limiter 53, a divider 54, and an adder 55 as illustrated in FIG. 5.

The offset voltage generator 51 generates an offset voltage command $V_{as}^*$ based on a 3-phase voltage command $V_{as}^*$, $V_{bs}^*, V_{cs}^*$, and the terminal voltage command generator 52 generates a terminal voltage command $V_{an}^*, V_{bn}^*, V_{cn}^*$ by subtracting from the 3-phase voltage command $V_{as}^*, V_{bs}^*$, $V_{cs}^*$ the value obtained by subtracting the common mode voltage $V_n^*$ from the offset voltage command $V_{as}^*$.

When the motor is controlled by the conventional open-end winding method, the offset voltage command $V_n s^*$ is generated based on the 3-phase voltage command $V_{as}^*$, $V_{bs}^*, V_{cs}^*$ and thus differs from the offset voltage outputted from each inverter when the motor is actually driven by two inverters. The first inverter and the second inverter generate different offset voltage commands $V_{as}^*$, and thus, the offset voltage corresponding to the offset voltage command is not actually outputted from each inverter.

This is expressed by EQUATION 1 below:

$$V_{ns1} = V_{n1}^* - V_{ns1}^* = 0.5 V_n^* - V_{ns1}^*$$

$$V_{ns2} = V_{n2}^* - V_{ns2}^* = -0.5 V_n^* - V_{ns2}^* \qquad \text{EQUATION 1:}$$

Accordingly, the common voltage finally applied to the motor is expressed by EQUATION 2 below, and the common mode voltage may not be controlled as desired:

$$V_{ns1} - V_{ns2} = V_n^* - V_{ns1}^* + V_{ns2}^* \qquad \text{EQUATION 2:}$$

A failure to control the common mode voltage to zero on average during a switching period may generate the common mode current of the motor, increase a loss occurring in the motor due to the flow of common mode current, and in severe cases, cause a burnout of the motor.

In FIG. 5, the terminal voltage command limiter 53 may limit the terminal voltage command to a range of ±0.5 of the DC voltage $V_{DC}$ applied to the first inverter and the second inverter, the divider 54 may divide the limited terminal voltage command by the DC voltage $V_{DC}$ applied to the first inverter and the second inverter, and the adder may adding 0.5 to the result of the obtained by the divider 54 to determine the duty $D_a, D_b, D_c$ of the switching elements in the inverter.

Because the terminal voltage command limiter 53, the divider 54, and the adder 55 correspond to the known technique applied to implement the pulse width modulation and the detailed operation may be performed by those skilled in the art, a further detailed description will be omitted.

Figure 6:
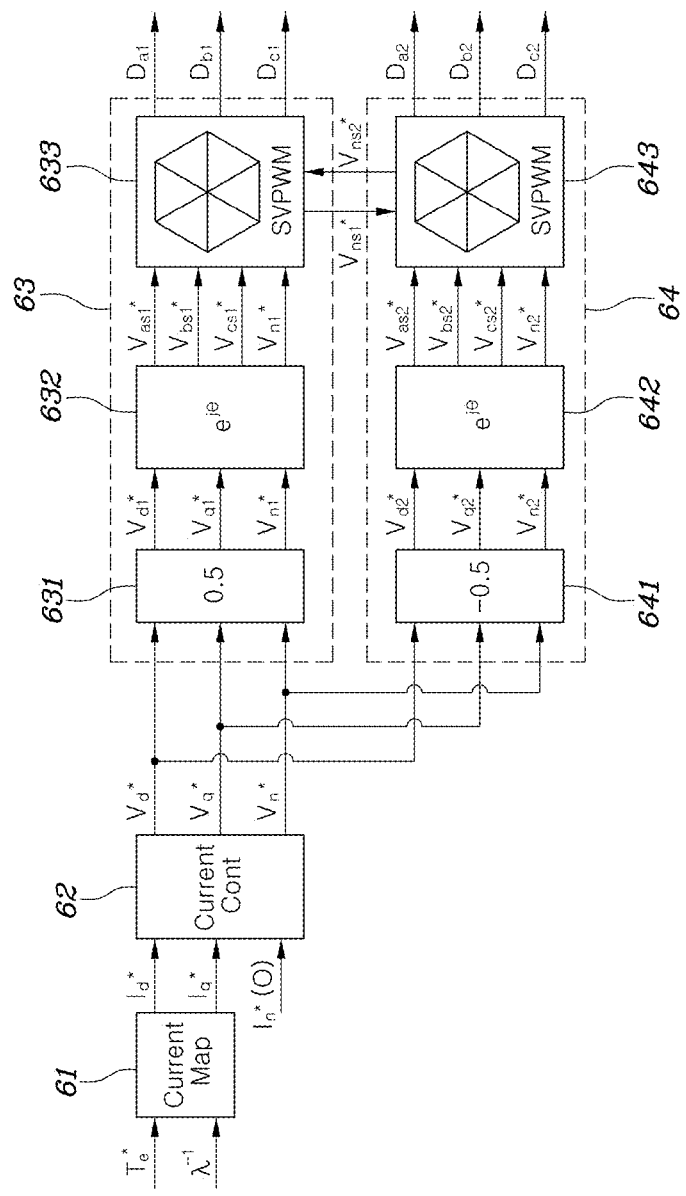
FIG. 6 is a block diagram illustrating in detail a controller applied to a motor driving apparatus according to various exemplary embodiments of the present disclosure.

FIG. 6 is a block diagram illustrating in detail the controller applied to a motor driving apparatus according to various exemplary embodiments of the present disclosure.

FIG. 6 shows that the controller 30 applied to the motor driving apparatus according to various exemplary embodiments of the present disclosure may include a current command map 61, a current controller 62, a first duty generator 63, and a second duty generator 64.

The current command map 61 may generate a current command $I_d^*, I_q^*$ corresponding the required motor output (motor required torque $T_c^*$, and back electromotive force $\lambda^{-1}$ of the motor) on which the generation is based.

The current controller 62 may receive the current command $(I_d^*, I_q^*)$ and generate a voltage command $V_d^*, V_q^*$, $V_n^*$ configured to reduce the difference between the received current command and the value obtained by detecting the current actually provided to the motor. The voltage command may include a d-axis component $V_d^*$, a q-axis component $V_q^*$, and a zero-phase component $V_n^*$.

The current command map 61 and the current controller 62 may be substantially the same as those applied to the conventional motor control technique illustrated in FIG. 2.

The first duty generator 63 is an element for generating the duty of the switching elements in the first inverter 10 and may include a multiplier 631 multiplying the voltage command $V_d^*, V_q^*, V_n^*$ by ½ to generate a first inverter voltage command $(V_{d1}^*, V_{q1}^*, V_{n1}^*)$ to be applied to the first inverter 10, a coordinate transformer 632 transforming the first inverter voltage command $V_{d1}^*, V_{q1}^*, V_{n1}^*$ into a first inverter phase voltage command $V_{as1}^*, V_{bs1}^*$, $V_{cs1}^*$corresponding to each phase of the motor, and a first space vector pulse width modulator 633 performing the space vector pulse width modulation based on the common mode $V_{n1}^*$ among the first offset voltage command $V_{ns1}^*$generated based on the first inverter phase voltage command $(V_{as1}^*, V_{bs1}^*, V_{cs1}^*)$ and the first inverter voltage command and the second offset voltage command $V_{ns2}^*$generated by the second duty generator 64 to generate the duty $(D_{a1}, D_{b1}, D_{c1})$ of the switching elements in the first inverter 10.

The second duty generator 64, like the first duty generator 63, is an element for generating the duty of the switching elements in the second inverter 20 and may include a multiplier 641 multiplying the voltage command $V_d^*, V_q^*$, $V_n^*$ by −½ to generate a second inverter voltage command $V_{d2}^*, V_{q2}^*, V_{n2}^*$to be applied to the second inverter 20, a coordinate transformer 642 transforming the second inverter voltage command $V_{d2}^*, V_{q2}^*, V_{n2}^*$into a second inverter phase voltage command $V_{as2}^*, V_{bs2}^*, V_{cs2}^*$corresponding to each phase of the motor, and a second space vector pulse width modulator 643 performing space vector pulse width modulation based on the second offset voltage command $V_{ns2}^*$generated based on the second inverter phase voltage command $V_{as2}^*, V_{bs2}^*, V_{cs2}^*$, the common mode $V_{n2}^*$among the second inverter voltage command, and the first offset voltage command $V_{ns1}^*$generated by the first duty generator 63 to generate the duty $D_{a2}, D_{b2}, D_{c2}$ of the switching elements in the second inverter 20.

According to various exemplary embodiments of the present disclosure, the first duty generator 63 and the second duty generator 64 share the offset voltage commands respectively determined according to the output voltage of the first inverter 10 and the second inverter 20 so that the two inverters have the same common mode voltage. That is, the first duty generator 63 for controlling the first inverter 10 may generate the first offset voltage command $V_{ns1}^*$using the first inverter phase voltage command $(V_{as1}^*, V_{bs1}^*$, $V_{cs1}^*)$ corresponding to the first inverter 10 output voltage and then provide the generated first offset voltage command $V_{ns1}^*$to the second duty generator 64, and the second duty generator 64 for controlling the second inverter 20 may generate the second offset voltage command $V_{ns2}^*$ using the second inverter phase voltage command ($V_{as2}^*$, $V_{bs2}^*$, $V_{cs2}^*$) corresponding to the second inverter 20 output voltage and provide the generated second offset voltage command $V_{ns2}^*$ to the first duty generator 63.

The first duty generator 63 and the second duty generator 64 may generate synthesized offset voltage commands including the same value by synthesizing the first offset voltage command $V_{ns1}^*$ and the second offset voltage command $V_{ns2}^*$ and generate the terminal voltage commands for each inverter by applying the synthesized offset voltage command and the common mode voltage command $V_{n1}^*$, $V_{n2}^*$ of each inverter to the phase voltage command of each inverter.

Figure 7:
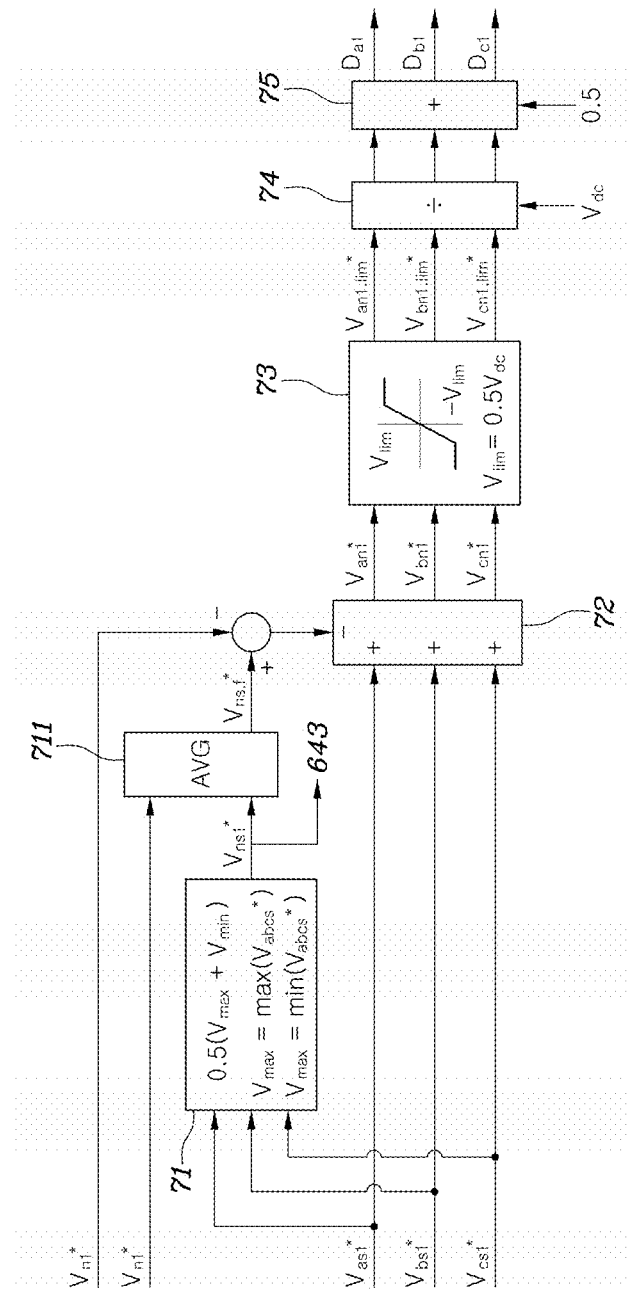
FIG. 7 is a block diagram illustrating in more detail a space vector modulator in a controller applied to a motor driving apparatus according to the exemplary embodiment of the present disclosure illustrated in FIG. 6.

FIG. 7 is a block diagram illustrating in more detail a space vector modulator in a controller applied to a motor driving apparatus according to an exemplary embodiment of the present. FIG. 7 illustrates the first space vector pulse width modulator 633 in the first duty generator 63 in detail. The second space vector pulse width modulator 643 in the second duty generator 64 may be implemented to have a corresponding configuration although it is not separately illustrated.

FIG. 7 shows that the first space vector pulse width modulator 633 in the first duty generator 63 may include an offset voltage generator 71, an offset voltage command synthesizer 711, a terminal voltage command generator 72, a terminal voltage command limiter 73, a divider 74, and an adder 75.

The offset voltage generator 71 may generate the offset voltage command $V_{ns1}^*$ based on the 3-phase voltage command $V_{as1}^*$, $V_{bs1}^*$, $V_{cs1}^*$ of the first inverter.

In the example illustrated in FIG. 7, the offset voltage generator 71 determines the average value of the maximum value and minimum value of the 3-phase voltage commands to obtain the offset voltage command $V_{ns1}^*$ of the first inverter 10, but this is just an example. The offset voltage command may be determined in various ways known in the art.

The offset voltage command synthesizer 711 may synthesize the offset voltage command $V_{ns1}^*$ of the first inverter 10 generated by the offset voltage generator 71 and the offset voltage command $V_{as2}^*$ of the second inverter 20 generated by the second space vector pulse width modulator 644 in the second duty generator 64 to generate a synthesized offset voltage command ($V_{ns,f}^*$).

The offset voltage command synthesizer 711 may generate the synthesized offset voltage command $V_{ns,f}^*$ in various ways. For example, the offset voltage command synthesizer 711 may generate the offset voltage command $V_{ns,f}^*$ by adding up the respectively weighted offset voltage command $V_{ns1}^*$ of the first inverter 10 and offset voltage command $V_{ns2}^*$ of the second inverter 20. Furthermore, the offset voltage command synthesizer 711 may determine the offset voltage command $V_{ns2}^*$ to be the average value of the offset voltage command $V_{ns1}^*$ of the first inverter 10 and the offset voltage command $V_{ns2}^*$ of the second inverter 20.

Regardless of how the offset voltage command synthesizer 711 generates the synthesized offset voltage command ($V_{ns,f}^*$), the synthesized offset voltage commands $V_{ns,f}^*$ respectively generated by the first space vector pulse width modulator 634 and the second space vector pulse width modulator 644 is to be implemented so that they have the same value.

When the offset voltage command synthesizer 711 determines the synthesized offset voltage command to be the average value of the offset voltage command $V_{ns1}^*$ of the first inverter 10 and the offset voltage command $V_{ns2}^*$ of the second inverter 20, the common mode voltage outputted from each inverter is expressed in EQUATION 3 below:

$$V_{ns1} = V_{n1}^* - N_{ns,f}^* = 0.5 V_n^* - 0.500 V_{ns1}^* + V_{ns2}^*)$$

$$V_{ns2} = V_{n2}^* - V_{ns,f}^* = -0.5 V_n^* - 0.5 * (V_{ns1}^* + V_{ns2}^*) \qquad \text{EQUATION 3:}$$

According to EQUATION 3, the difference $V_{ns1} - V_{ns2}$ between the common mode voltages of the two inverters may be outputted as the common mode voltage command $V_n^*$ set by the current controller 62. Here, when the synthesized offset voltage command $V_{ns,f}^*$ finally applied to the modulation of the two inverters is determined to be the average of the two offset voltage commands $V_{ns1}^*$, $V_{ns2}^*$, the output duty margin of the two inverters is the same so that the synthesized offset voltage command $V_{ns,f}^*$ is determined to be the average of the two offset voltage commands $V_{ns1}^*$, $V_{ns2}^*$.

In FIG. 7, the terminal voltage command generator 72 may generate the terminal voltage command $V_{an1}^*$, $V_{bn1}^*$, $V_{cn1}^*$ of the first inverter 10 by subtracting the value obtained by subtracting the common mode voltage command $V_{n1}^*$ among the voltage commands of the first inverter 10 from the synthesized offset voltage command $V_{ns,f}^*$ from the 3-phase voltage command $V_{as1}^*$, $V_{bs1}^*$, $V_{cs1}^*$ of the first inverter 10.

In FIG. 7, the terminal voltage command limiter 73 may limit the terminal voltage command to a range of ±0.5 of the DC voltage $V_{DC}$ applied to the first inverter and the second inverter, the divider 74 may divide the limited terminal voltage command by the DC voltage $V_{DC}$ applied to the first inverter and the second inverter, and the adder may determine the duty $D_a$, $D_b$, $D_c$ of the switching elements in the inverter by adding 0.5 to the result of the obtained by the divider 74.

Because the terminal voltage command limiter 73, the divider 74, and the adder 75 correspond to the known technique applied to implement the pulse width modulation and the detailed operation may be performed by those skilled in the art, a further detailed description will be omitted.

Furthermore, FIG. 7 illustrates the detailed configuration of the space vector pulse width modulator 633 in the first duty generator 63, but those skilled in the art may easily infer a detailed configuration of the space vector pulse width modulator 643 of the second duty generator 64. Accordingly, a separate description of the space vector pulse width modulator 643 in the second duty generator 64 will be omitted.

Figure 8:
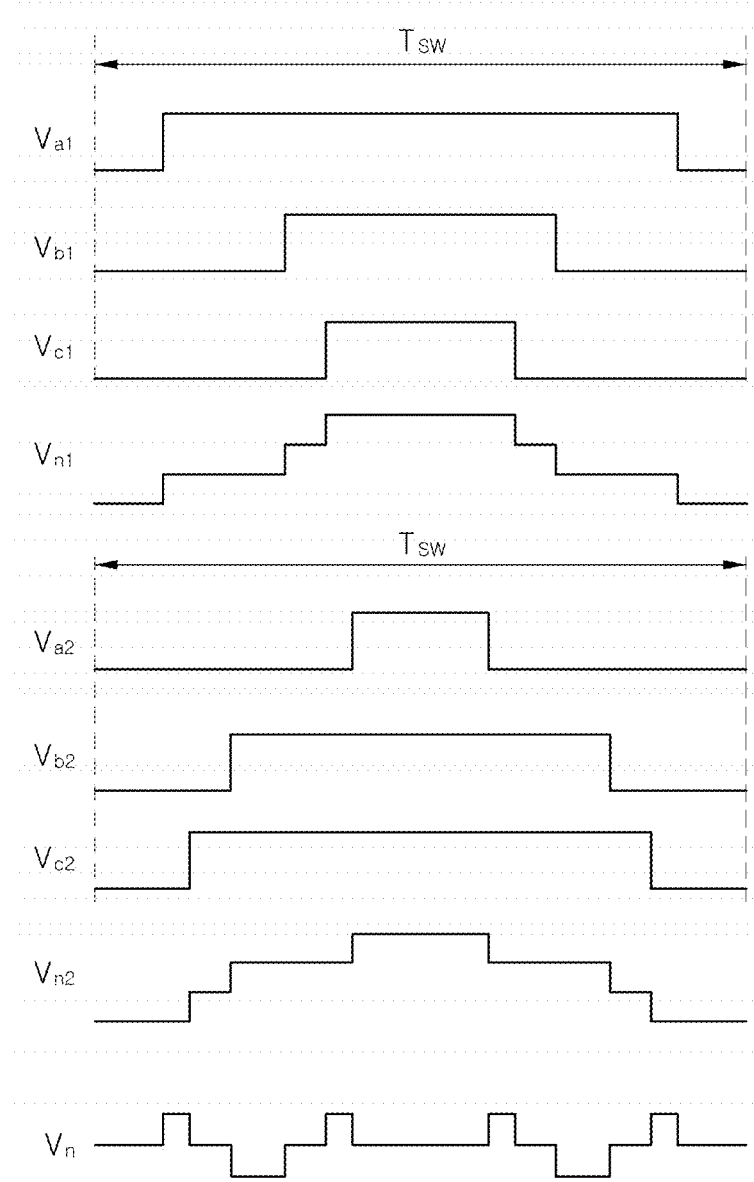
FIG. 8 is a waveform diagram illustrating a voltage output of each inverter generated by control of a motor driving apparatus according to the exemplary embodiment of the present disclosure illustrated in FIG. 6.

FIG. 8 is a waveform diagram illustrating a voltage output of each inverter generated by control of a motor driving apparatus according to various exemplary embodiments of the present disclosure illustrated in FIG. 6.

Compared with the waveform of the conventional motor driving apparatus illustrated in FIG. 4, FIG. 8 shows that it may be confirmed that the common mode voltage $V_n$ of the motor is determined to have one-period average value of zero according to the motor driving apparatus according to various exemplary embodiments of the present disclosure.

Therefore, according to various exemplary embodiments of the present disclosure, the motor driving apparatus may perform desired control so that the common mode voltage is not distorted by the space vector pulse width modulation, and thus the common mode current generated in the motor may be suppressed, reducing avoidable losses of the motor and preventing burnout of the motor.

According to the exemplary embodiment of the present disclosure described above and illustrated in FIGS. 6 to 8, the average of the common mode voltage during a switching period is controlled to zero. In such an exemplary embodiment of the present disclosure, the common mode voltage may be controlled to zero on average during a period. However, the common mode voltage may instantaneously pulsate and generate a common mode current, and the instantaneous common mode current may also incur a loss of the motor. Another exemplary embodiment of the present disclosure configured to remove the instantaneous common mode current by suppressing the pulsation of the common mode voltage will be described in the following.

Figure 9:
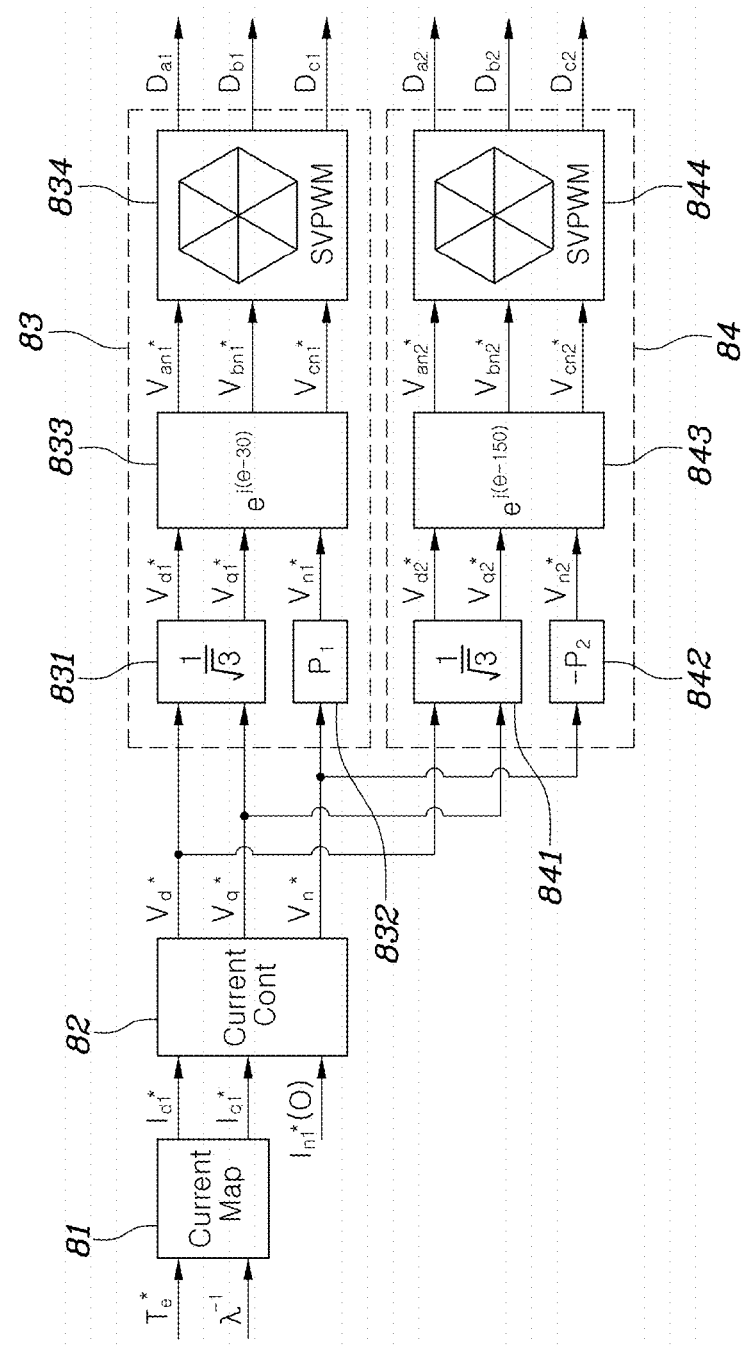
FIG. 9 is a block diagram illustrating in detail a controller applied to a motor driving apparatus according to various exemplary embodiments of the present disclosure.

FIG. 9 is a block diagram illustrating in detail a controller applied to a motor driving apparatus according to another exemplary embodiment of the present.

FIG. 9 shows that the controller 30 of the motor driving apparatus according to various exemplary embodiments of the present disclosure may include a current command map 81, a current controller 82, a first duty generator 83, and a second duty generator 84.

The current command map 81 may generate current commands $I_d^*$, $I_q^*$ corresponding to the required motor output (required motor torque $T_e^*$ and back electromotive force $\lambda^{-1}$ of the motor) on which the current command generation is based.

The current controller 82 may receive the current command $I_d^*$, $I_q^*$ and generate a voltage command $V_d^*$, $V_q^*$, $V_n^*$ configured to reduce the difference between the received current command and the value obtained by detecting the current actually provided to the motor. The voltage command may include a d-axis component $V_d^*$, a q-axis component $V_q^*$, and a zero-phase component $V_n^*$.

The current command map 81 and the current controller 82 may be substantially the same as those applied to the conventional motor control technique illustrated in FIG. 2.

The first duty generator 83 is an element for generating the duty of the switching elements in the first inverter 10 and may include a multiplier 831 multiplying the d-axis voltage command $V_d^*$ and q-axis voltage command $V_q^*$ of the voltage command $V_d^*$, $V_q^*$, $V_n^*$ by $1/\sqrt{3}$ to generate a first inverter d-axis voltage command $Vd1^*$ and a first inverter q-axis voltage command $V_{q1}^*$ to be applied to the first inverter a second multiplier 832 multiplying the common mode voltage command of the voltage command $V_d^*$, $V_q^*$, $V_n^*$ by $P_1$, to generate a first inverter common mode voltage command $V_{a1}^*$, a coordinate transformer 833 transforming the first inverter voltage command $V_{d1}^*$, $V_{q1}^*$, $V_{n1}^*$ into a first inverter phase voltage command $V_{an1}^*$, $V_{bn1}^*$, $V_{cn1}^*$ corresponding to each phase of the motor so that the first inverter phase voltage command leads or trails 30 degrees ahead of or behind the rotation angle θ of the motor, and the first space vector pulse width modulator 834 performing the space vector pulse width modulation based on the first inverter phase voltage command $V_{an1}^*$, $V_{bn1}^*$, $V_{cn1}^*$ to generate the duty ($D_{a1}$, $D_{b1}$, $D_{c1}$) of the switching elements in the first inverter 10.

The second duty generator 84 is an element for generating the duty of the switching elements in the second inverter 20 and may include a third multiplier 841 multiplying the d-axis voltage command $V_d^*$ and q-axis voltage command $V_q^*$ of the voltage command $V_d^*$, $V_q^*$, $V_n^*$ by ii to generate a second inverter d-axis voltage command $V_{d2}^*$ and a second inverter q-axis voltage command $V_{q2}^*$ to be applied to the second inverter 20, a fourth multiplier 842 multiplying the common mode voltage command of the voltage command $V_d^*$, $V_q^*$, $V_n^*$ by $-P_2$ (here, $P_1+P_2=1$) to generate the second inverter common mode voltage command $V_{n2}^*$, a coordinate transformer 843 transforming the second inverter voltage command $V_{d1}^*$, $V_{q2}^*$, $V_{n2}^*$ into the second inverter phase voltage command $V_{as1}^*$, $V_{bs2}^*$, $V_{cs2}^*$ corresponding to each phase of the motor so that the second inverter phase voltage command leads or trails 150 degrees ahead of or behind the rotation angle θ of the motor, and a second space vector pulse width modulator 844 performing the space vector pulse width modulation based on the second inverter phase voltage command $V_{as2}^*$, $V_{bs2}^*$, $V_{cs2}^*$ to generate the duty $D_{a2}$, $D_{b2}$, $D_{c2}$ of the switching elements in the second inverter 20.

Here, it is known in the art that the rotation angle θ of the motor may be obtained from a rotation angle sensor provided in the motor.

According to various exemplary embodiments of the present disclosure, in a process of transforming the d-axis voltage command and the q-axis voltage command into a 3-phase voltage command, the first duty generator 83 and the second duty generator 84 perform the coordinate transformation such the two voltage commands differ from each other by 120 degrees.

Figure 10:
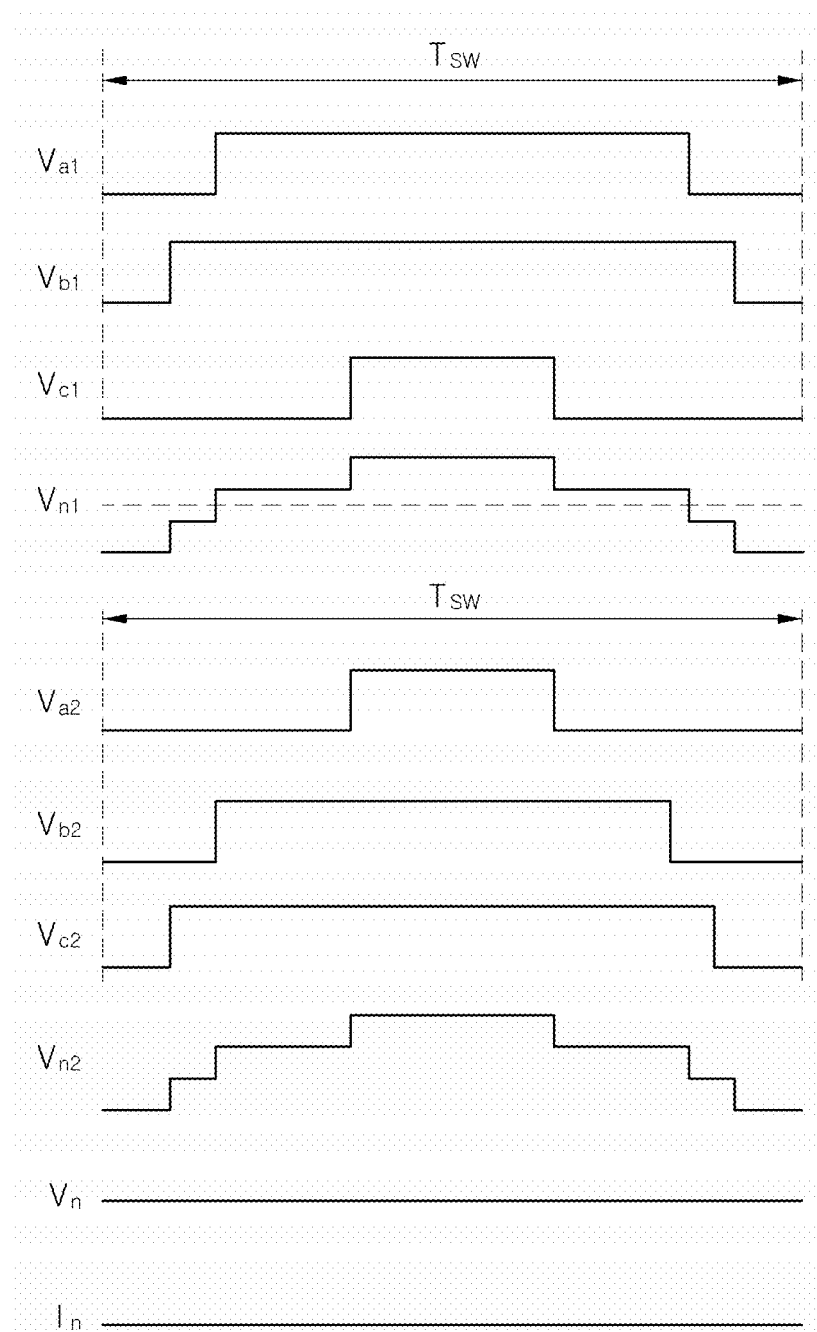
FIG. 10 is a waveform diagram illustrating a voltage output, a common voltage component, and a common mode current of each inverter generated by control of a motor driving apparatus according to the another exemplary embodiment of the present disclosure illustrated in FIG. 9.

As illustrated in FIG. 10, it may be confirmed that the same common component voltages $V_{n1}$, $V_{n2}$ instantaneously appear when modulation is performed using two voltage vectors when the voltage vectors outputted by the two inverters have a difference of 120 degrees. Therefore, it may be confirmed that the difference $V_n$ between the common component voltages of two inverters instantaneously becomes 0, and the common component current ripple (common mode current) due to the difference in the common component voltages also becomes 0.

On the other hand, according to various exemplary embodiments of the present disclosure, different common component voltage commands $V_n^*$ may be distributed for each inverter. That is, in FIG. 9, the multiplier value P1 for the first inverter and the multiplier value P2 for the second inverter set by the second multiplier 832 and the fourth multiplier 842 may be determined to have different magnitudes. Here, the sum of the magnitudes of the two multiplier values should be 1 ($P_1+P_2=1$).

Because the distribution of the common voltage command $V_n^*$ does not affect the motor output, it makes no difference for the motor.

For example, when the common component voltage is equally distributed (when the magnitudes of $P_1$ and $P_2$ are the same), the final output duty of the two inverters may differ due to an error such as switching dead time and compensation therefor existing in the inverter, and one inverter may be subjected to a duty limit first accordingly.

On the other hand, if the two inverters are provided a free hand in the distribution of the common voltage command, a means for equalizing the maximum values of duty that differ from each other due to an error, such as dead time, existing in the inverter may be provided, which may increase the output of the motor. That is, tuning the multiplier values $P_1$, $P_2$ allows a proper resolution of the problem caused by an error inherent in the inverter, improving the motor output.

According to the exemplary embodiment of the present disclosure described with reference to FIG. 9, FIG. 10, FIG. 11 and FIG. 12, the common output voltage due to the space vector pulse width modulation (SWPWM) of the two inverters may be generated equally by setting the phases of the voltage vectors of the two inverters to a difference of 120, removing the common switching pulsation between the two inverters.

However, the present exemplary embodiment employs a method of separating the voltage for driving each inverter from the voltage command $V_{dqn}*$ of the entire motor driving system and then performing the operations for driving each inverter by space vector pulse width modulation. The problem of the present method is that a lot of operations for the coordinate transformation, magnitude limiting, and the like are required and that the output voltage of the inverter is subject to an error caused by discrete errors in sine and cosine operations.

Therefore, various aspects of the present disclosure are directed to providing various exemplary embodiments configured to resolve the switching pulsation caused by the common voltage through a simpler operation.

Figure 11:
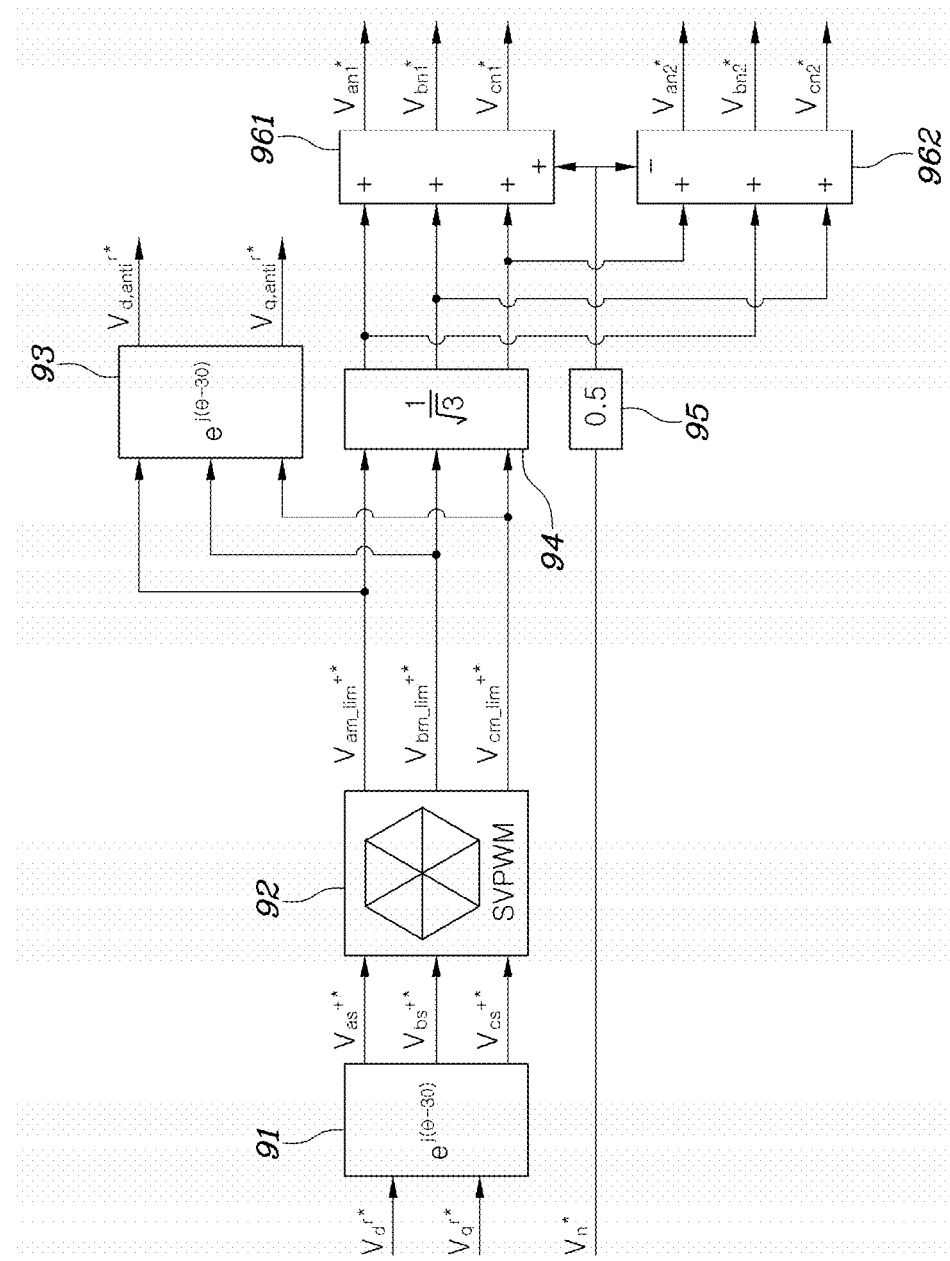
FIG. 11 is a block diagram illustrating in detail a controller applied to a motor driving apparatus according to various exemplary embodiments of the present disclosure.
Figure 12:
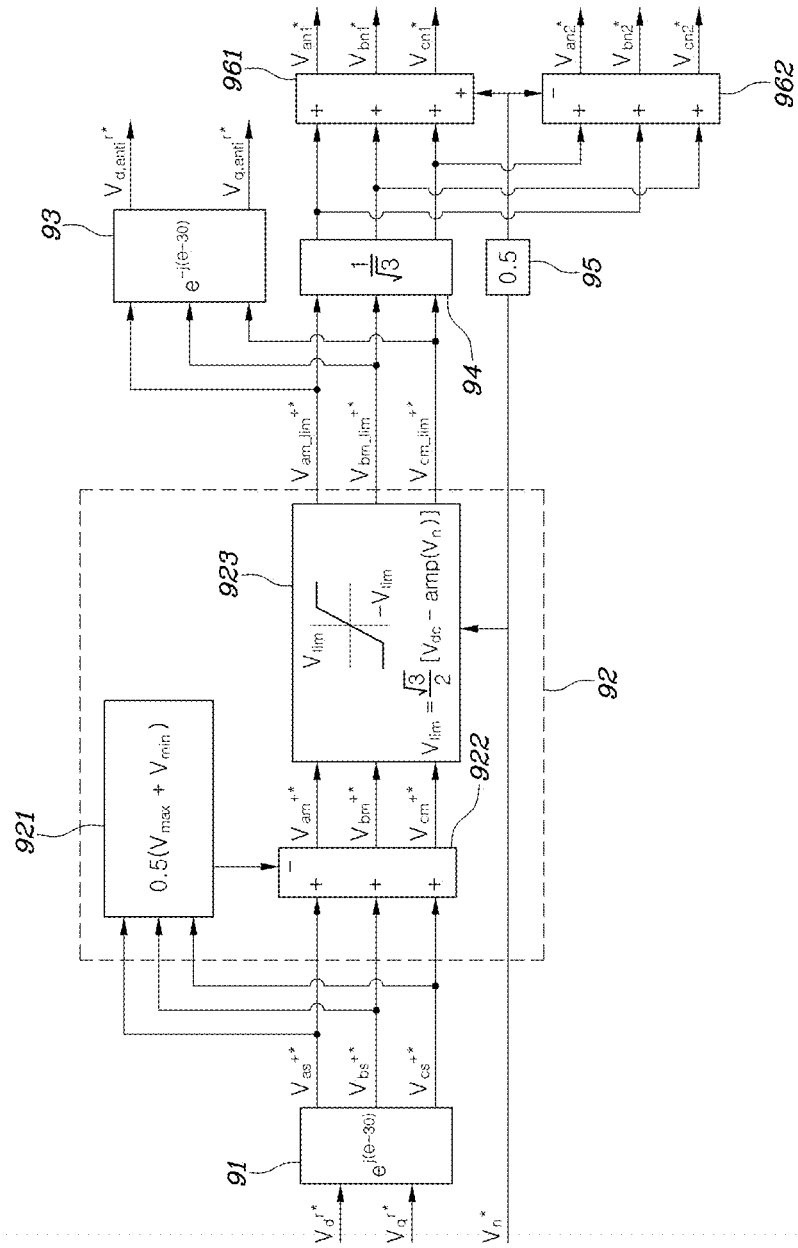
FIG. 12 is a block diagram of a controller illustrating in more detail a space vector pulse width modulator illustrated in FIG. 11.

FIG. 11 is a block diagram illustrating in detail a controller applied to a motor driving apparatus according to various exemplary embodiments of the present disclosure, and FIG. 12 is a block diagram of a controller illustrating in more detail a space vector pulse width modulator illustrated in FIG. 11.

FIG. 11 and FIG. 12 show that the controller 30 of the motor driving apparatus according to various exemplary embodiments of the present disclosure may include a coordinate transformer 91, a space vector pulse width modulator 92, a multiplier 94, a first terminal voltage command generator 961, and a second terminal voltage command generator 962. The example of the controller illustrated in FIG. 11 may include the current command map 81 and the current controller 82 included in the exemplary embodiment illustrated in FIG. 9, of course. That is, the coordinate transformer 91 in the exemplary embodiment of FIG. 11 may receive the voltage command (dq voltage command of the synchronous coordinate system) $V_d^{r*}$, $V_q^{r*}$ of the motor generated by the current controller 82 of the exemplary embodiment illustrated in FIG. 9 for operation.

The coordinate transformer 91 may receive the voltage command $V_d^{r*}$, $V_q^{r*}$ of the motor generated by the current controller and generate the phase voltage command $V_{as}^{+*}$, $V_{bs}^{+*}$, $V_{cs}^{+*}$ trailing 30 degrees behind the rotation angle θ of the motor by transforming the received voltage command $V_d^{r*}$, $V_q^{r*}$ so that the received voltage command $V_d^{r*}$, $V_q^{r*}$ trails 30 degrees behind the rotation angle θ of the motor. The coordinate transformation performed by the coordinate transformer 91 may be accomplished by applying a known technique, the Inverse Clarke/Park Transformation.

The space vector pulse width modulator 92 may receive phase voltage command $V_{as}^{+*}$, $V_{bs}^{+*}$, $V_{cs}^{+*}$ trailing 30 degrees behind the rotation angle θ of the motor outputted by the coordinate transformer 91 and generate a limited terminal voltage command $V_{am\_lim}^{+*}$, $V_{bm\_lim}^{+*}$, $V_{cm\_lim}^{+*}$ trailing 30 degrees behind the rotation angle θ of the motor by performing the vector space pulse width modulation based on the received phase voltage command $V_{as}^{+*}$, $V_{bs}^{+*}$, $V_{cs}^{+*}$.

The space vector pulse width modulator 92 may include the offset voltage generator 921 generating the offset voltage corresponding to the average of the maximum value and minimum value of the phase voltage command $V_{as}^{+*}$, $V_{bs}^{+*}$, $V_{cs}^{+*}$ trailing 30 degrees behind the rotation angle θ of the motor, the terminal voltage command generator 922 generating the terminal voltage command $V_{am}^{+*}$, $V_{bm}^{+*}$, $V_{cm}^{+*}$ trailing 30 degrees behind the rotation angle θ of the motor by subtracting the offset voltage from the phase voltage command $V_{as}^{+*}$, $V_{bs}^{+*}$, $V_{cs}^{+*}$ trailing 30 degrees behind the rotation angle θ of the motor, and the terminal voltage command limiter 923 limiting the terminal voltage command $V_{am}^{+*}$, $V_{bm}^{+*}$, $V_{cm}^{+*}$ which is generated by the terminal voltage command generator 922 and trails 30 degrees behind the rotation angle θ of the motor to generate the terminal voltage command $V_{am\_lim}^{+*}$, $V_{bm\_lim}^{+*}$, $V_{cm\_lim}^{+*}$ trailing 30 degrees behind the rotation angle (θ) of the motor.

It is known that driving a motor by the open-end winding method of switching two inverters respectively connected to either end of the windings of the motor may obtain $\sqrt{3}$ times the output compared to driving the motor by the closed-end winding method of connecting the windings of the motor to each other at one end and switching one inverter at the other end. Accordingly, in the exemplary embodiment in FIG. 11 and FIG. 12, the terminal voltage command limiter 923 may limit the upper and lower limits of the terminal voltage command to $\sqrt{3}/2)*V_{dc}$ instead of the DC-link voltage Vdc of the inverter. That is, the upper limit set by the terminal voltage command limiter 923 may be "$+(\sqrt{3}/2)*V_{dc}$" and the lower limit may be "$-(\sqrt{3}/2)*V_{dc}$".

On the other hand, when the terminal voltage command limiter 923 set the upper limit to "$+(\sqrt{3}/2)*V_{dc}$" and the lower limit to "$-(\sqrt{3}/2)*V_{dc}$", the margin for adding and subtracting 0.5 times the common component voltage command $V_n^*$ may be insufficient at the rear end. Accordingly, when the limit of a virtual terminal voltage command is changed to $\pm\{(\sqrt{3}/2)*V_{dc}-amp(V_n^*)\}$ (here, amp is an operator representing the magnitude), the margin for the common component voltage command $V_n^*$ to be added later may be secured by reducing the voltage limit by the common component voltage command $V_n^*$ added to the rear.

When the switching elements in the first inverter 10 and the switching elements in the second inverter 20 are switched by generating a duty based on the terminal voltage commands respectively outputted by the first terminal voltage command generator 961 and the second terminal voltage command generator 962, the voltage of the first inverter trails 30 degrees behind the motor voltage command as in the exemplary embodiment illustrated in FIG. 9 and the voltage of the second inverter has a phase difference of 120 degrees from the voltage of the first inverter, so that the common current may be removed.

Since the exemplary embodiment illustrated in FIG. 11 and FIG. 12 first perform the space vector pulse width modulation based on the voltage command of the motor and then generate the terminal voltage command for each inverter based on the outputted result, the amount of operation for the coordinate transformation may be minimized compared to the exemplary embodiment illustrated in FIG. 9 and the discrete error caused by sine and cosign operations during the voltage modulation operation accordingly.

Figure 13:
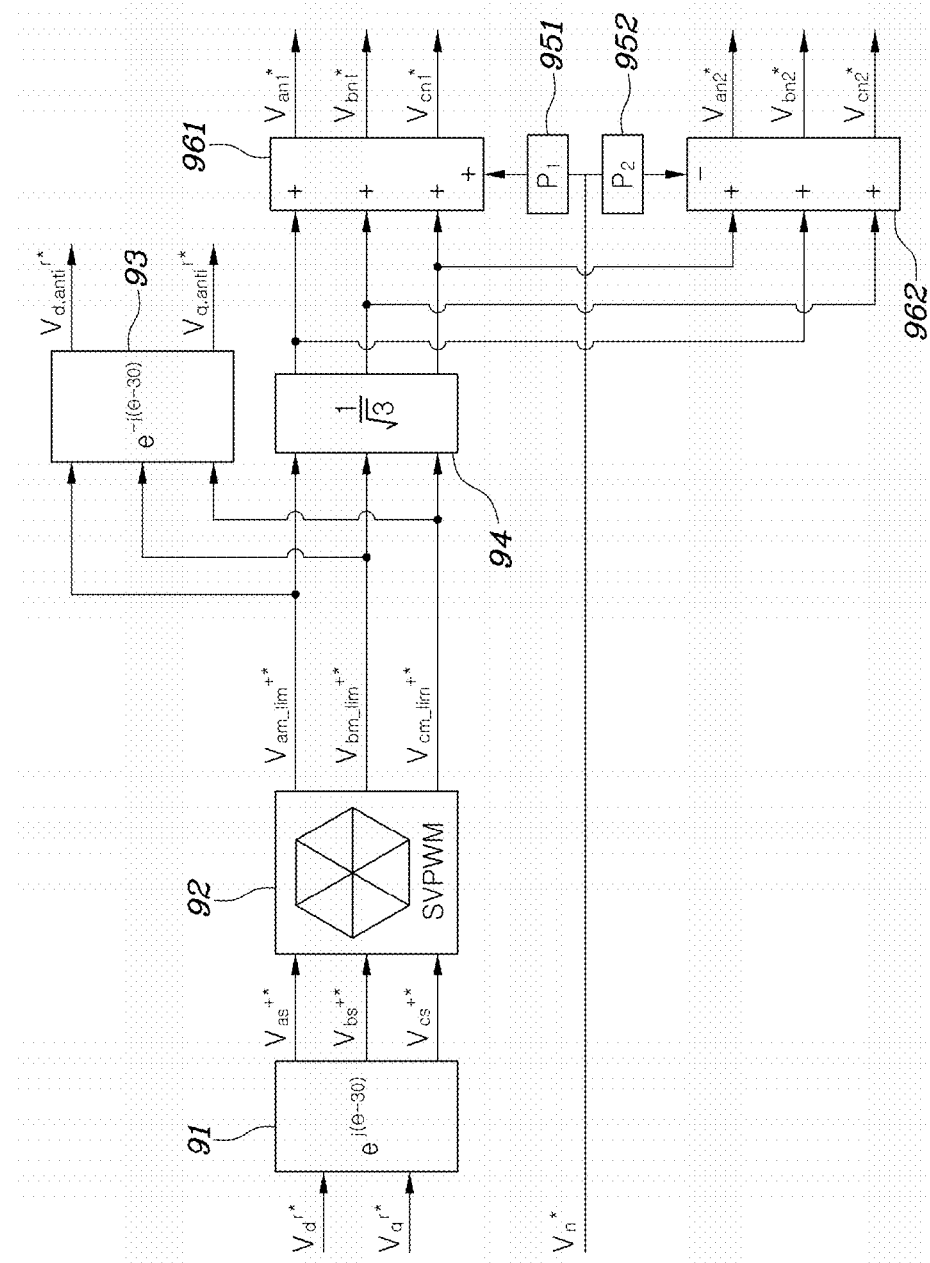
FIG. 13 is a block diagram illustrating a modification example of a controller of the exemplary embodiment illustrated in FIG. 11.

On the other hand, the multiplier 95 for multiplying the common voltage command $V_n^*$ by 0.5 is applied in FIG. 11 and FIG. 12, but the different common component voltage commands $V_n^*$ may be distributed for each inverter as illustrated in FIG. 13.

FIG. 13 is a block diagram illustrating a modification example of a controller according to the exemplary embodiment illustrated in FIG. 11.

FIG. 13 shows that the multiplier value $P_1$ for the common voltage command added to the first terminal voltage command generator 961 and the multiplier value $P_2$ for the common voltage command added to the second terminal voltage command generator 962 may be determined to have different sizes. Here, the sum of the two multiplier values should be 1 ($P_1+P_2=1$).

As already stated in the description of the exemplary embodiment in FIG. 9, because the distribution of the common voltage command $V_n^*$ does not affect the motor output, it makes no difference for the motor. If the two inverters are provided a free hand in the distribution of the common voltage command, a means for equalizing the maximum values of duty that differ from each other due to an error existing in the inverter, such as dead time, may be provided, which may increase the output of the motor.

That is, tuning the multiplier values $P_1$, $P_2$ allows a proper resolution of the problems caused by an error inherent in the inverter itself, improving the motor output.

On the other hand, reference numeral "93" denotes an anti-windup operator for generating a signal fed back to an integral controller (corresponding to the current controller 82 in FIG. 9).

According to the exemplary embodiment illustrated in FIG. 11, FIG. 12 and FIG. 13, the voltage command $V_d^{r*}$, $V_q^{r*}$ of the motor corresponding to the output of the current controller 82 is limited by the terminal voltage command 923 in the space vector pulse width modulator 92, and then each inverter is switched by the limited command. That is, the current controller 82 needs to receive feed-back on the extent to which the voltage command outputted by the current controller 82 is limited during actual application to the inverter control to perform an accurate feed-back control.

The anti-windup operator 93 may transform the limited terminal voltage command $V_{am\_lim}^{+*}$, $V_{bm\_lim}^{+*}$, $V_{cm\_lim}^{+*}$ trailing 30 degrees behind the rotation angle θ of the motor into trailing 30 degrees behind the rotation angle θ of the motor by the Clarke/Park Transformation and feed it back to the current controller.

Furthermore, according to various exemplary embodiments of the present disclosure, the voltage of the first inverter 10 may lead the voltage command of the motor by 30 degrees. In the instant case, the voltage of the second inverter 20 may lead the voltage of the first inverter 10 by 120 degrees. Accordingly, the second terminal voltage command generator 962 may respectively add half the common voltage command $V_n^*$ to the values outputted by the multiplier 94 and determine the value obtained by adding half the common voltage command $V_n^*$ to the value corresponding to the a-phase of the values outputted by the multiplier 94 to be the c-phase terminal voltage command of the second inverter 20, the value obtained by adding half the common voltage command $V_n^*$ to the value corresponding to the b-phase of the values outputted by the multiplier 94 to be the a-phase terminal voltage command of the second inverter 20, and the value obtained by adding half the common voltage command $V_n^*$ to the value corresponding to the c-phase of the values outputted by the multiplier 94 to be the b-phase terminal voltage command of the second inverter 20.

According to the exemplary embodiment described above, the switching element corresponding to each phase of the first inverter 10 and the second inverter 20 performs switching once during one switching period. Here, one-time switching means that the switching element changes over from an OFF state to an ON state and then changes over back to an OFF state, or changes over from an ON state to an OFF state and then changes over back to an ON state.

This method of switching the switching elements in the inverter is efficient when the first switching elements S11-S16 in the first inverter 10 and the second switching elements S21-S26 in the second inverter 20 are the same type of switching elements.

However, when the first switching elements S11-S16 in the first inverter 10 and the second switching elements S21-S26 in the second inverter 20 are different types of switching elements, for example, when the first switching elements S11-S16 are metal-oxide-semiconductor field-effect transistors (MOSFET) made of SiC which is a material with relatively low switching loss and the second switching elements S21-S26 are insulated gate bipolar transistors (IGBT) made of Si which is a relatively inexpensive material with relatively high switching loss, switching the first switching elements S11-S16 and the second switching elements S21-S26 the same number of times is inefficient, resulting in a high switching loss in motor control despite a room for reducing the switching loss.

various aspects Accordingly, various aspects of the present disclosure are directed to providing a new control technique configured to reduce the switching loss and improve system efficiency when the first switching elements S11-S16 in the first inverter and the second switching elements S21-S26 in the second inverter are different types of switching elements made of different kinds of materials.

Figure 14:
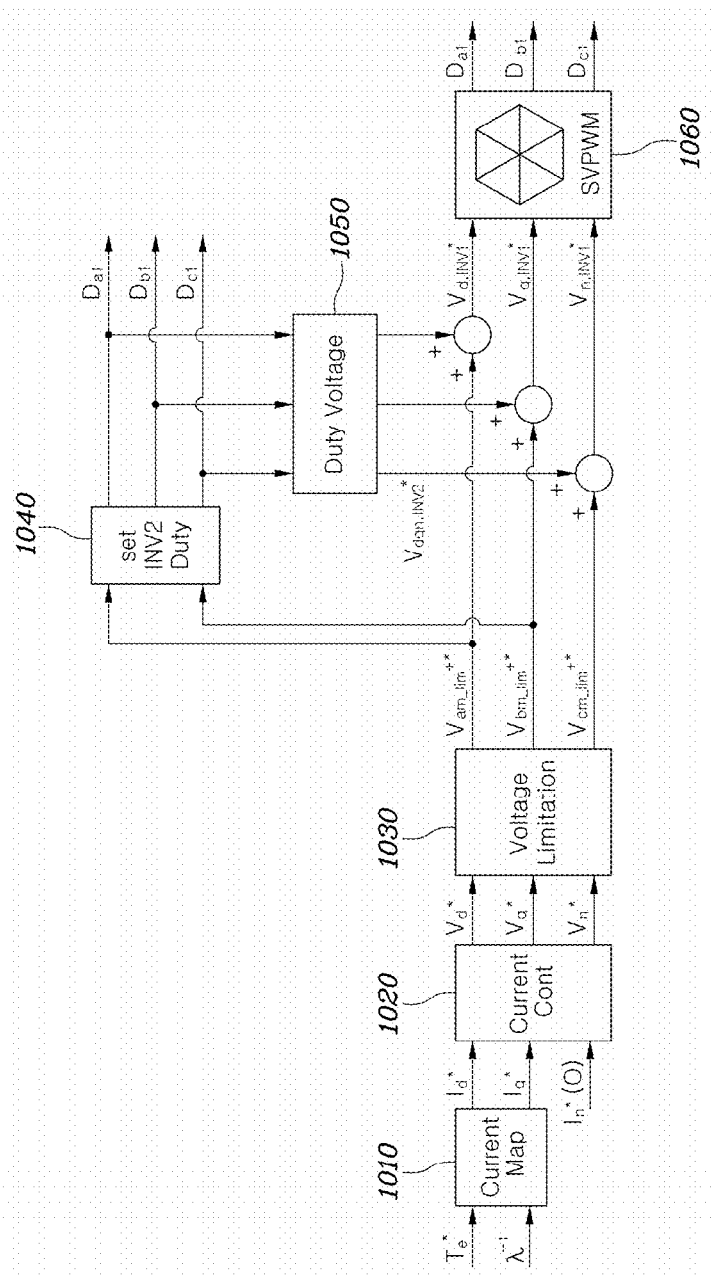
FIG. 14 is a block diagram illustrating in detail a controller applied to a motor driving apparatus according to various exemplary embodiments of the present disclosure.

FIG. 14 is a block diagram illustrating in detail a controller applied to a motor driving apparatus according to various exemplary embodiments of the present disclosure. Hereinafter, an example will be described where the second switching elements S21-S26 forming the second inverter 20 are elements with a high switching loss like IGBT made of Si and the first switching elements S11-S16 forming the first inverter 10 are elements with low switching loss like MOSFET made of SiC.

FIG. 14 shows that the controller 30 of the motor driving apparatus according to various exemplary embodiments of the present disclosure may include a current command map 1010, a current controller 1020, a voltage limiter 1030, a duty generator for the second inverter 1040, a coordinate transformer 1050, and a pulse width modulator for the first inverter 1060.

The current command map 1010 and the current controller 1020 may be substantially the same as the current command map and the current controller applied to the exemplary embodiment illustrated in FIG. 6 or 9.

That is, based on the required motor output (required motor torque $T_c^*$ and back electromotive force $\lambda^{-1}$ of the motor) generated by the manipulation of the driver, the current command map 1010 may generate corresponding current command $I_d^*$, $I_q^*$. Furthermore, the current controller 1020 may receive the current command $I_d^*$, $I_q^*$ and generate the voltage command $V_d^*$, $V_q^*$, $V_n^*$ configured to reduce the difference between the received current command $I_d^*$, $I_q^*$ and the value obtained by detecting the current actually provided to the motor. The voltage command may include a d-axis component $V_d^*$, a q-axis component $V_q^*$, and a zero-phase component $V_n^*$.

The voltage limiter 1030 may limit the upper and lower limits of the voltage command $V_d^*$, $V_q^*$, $V_n^*$ generated by the current controller 1020 to generate a limited voltage command $V_{d,lim}^*$, $V_{q,lim}^*$, $V_{n,lim}^*$. The voltage limiter 1030 may store preset upper and lower limits for the voltage command in advance, and the upper and lower limits may be determined in advance according to the upper and lower limits of the motor voltage which may be generated by controlling the switching elements in the first inverter 10 and the second inverter 20.

The duty generator for the second inverter 1040 may determine the switching duty of the second switching elements S21-S26 in the second inverter 20 based on the limited voltage command $V_{d,lim}^*$, $V_{q,lim}^*$.

The exemplary embodiment illustrated in FIG. 14 shows an example of a controller 30 applied when the second switching elements S21-S26 applied to the second inverter 20 is subject to higher switching loss compared to the first switching elements S11-S16 applied to the first inverter 10. That is, the exemplary embodiment illustrated in FIG. 14 exemplifies a case where the switching loss of the second switching elements S21-S26 with a relatively higher switching loss may be reduced by switching only the first switching elements S11-S16 of the first inverter 10 without switching the second switching elements S21-S26 of the second inverter 20 during one switching period.

The duty generator for the second inverter 1040 may generate the second inverter duty based on an active voltage vector closest to the value obtained by taking a negative value of the limited voltage command $V_{d,lim}^*$, $V_{q,lim}^*$.

Figure 15:
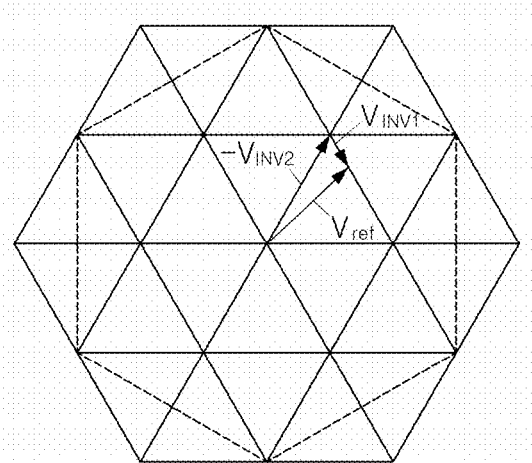
FIG. 15 is a voltage vector diagram for describing a voltage of each inverter and a motor voltage determined by the various exemplary embodiments illustrated in FIG. 14.
Figure 15:
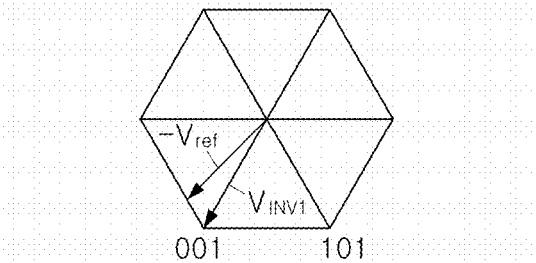
Figure 15:
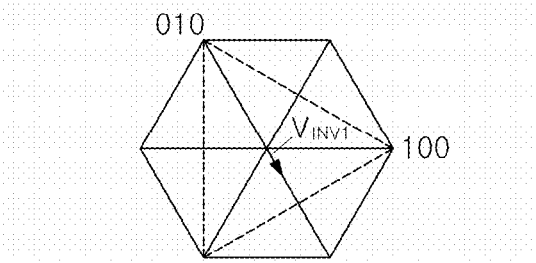

FIG. 15 is a voltage vector diagram for describing the voltage of each inverter and motor voltage determined by the exemplary embodiment illustrated in FIG. 14.

FIG. 15 shows that, as illustrated above, the voltage of the motor corresponds to the voltage of the first inverter minus the voltage of the second inverter so that the voltage vector $V_{ref}$ corresponding to the voltage command $V_{d,lim}^*$, $V_{q,lim}^*$ may be generated by subtracting the voltage vector $V_{INV2}$ of the second inverter 20 from the voltage vector $V_{INV1}$ of the first inverter 10.

The duty generator for the second inverter 1040 may determine an active voltage vector corresponding to one of the vertices of the hexagon on the vector diagram to be the voltage vector of the second inverter. The duty generator for the second inverter 1040 may determine an active vector ([001] in FIG. 15) closest to the voltage vector corresponding to the negative value of the voltage vector $V_{ref}$ corresponding to the voltage command $V_{d,lim}^*$, $V_{q,lim}^*$ to be the voltage vector of the second inverter for the optimal operation. Accordingly, only c-phase voltage may maintain a high state during one switching period in the second inverter (the upper switching elements S21, S23 of a-phase and b-phase legs of the second inverter 20 are in the OFF state, the lower switching elements S22, S24 of a-phase and b-phase legs of the second inverter 20 are in the ON state, the upper switching element S25 of a c-phase leg of the second inverter 20 is in the ON state, and the lower switching element S26 of the c-phase leg of the second inverter 20 is in the OFF state).

There may be many techniques by which the duty generator for the second inverter 1040 determines an active vector closest to the voltage command $V_{ref}$ corresponding to the command vector $V_{d,lim}^*$, $V_{q,lim}^*$. The method of determining using the sign of each 3-phase voltage corresponding to the voltage command $V_{d,lim}^*$, $V_{q,lim}^*$ is the simplest and most effective.

The duty generator for the second inverter 1040 may transform the voltage command into abc coordinates corresponding to motor three phases using Inverse Clarke/Park Transformation and determine the voltage vector of the second inverter 20, that is, the duty of the second inverter 20, according to the transformed abc coordinates as shown in EQUATION 4 below:

$$D_{abc,inv2} = \text{Sign}(V_{abcn,lim}^*), \qquad \text{EQUATION 4:}$$

where if x>=0, Sign(x)=1; If x<0, Sign(x)=0.

The coordinate transformer 1050 may transform the voltage vector corresponding to the duty of the second inverter 20 back into dq coordinate through Clarke/Park Transformation.

The pulse width modulator for the first inverter 1060 may receive the value obtained by summing up the values obtained by transforming the voltage vector corresponding the duty of the second inverter 20 transformed from the voltage command $V_{d,lim}^*$, $V_{q,lim}^*$, $V_{n,lim}^*$ by the coordinate transformer 1050 as the voltage command $V_{d,INV1}^*$, $V_{q,INV2}^*$, $V_{n,INV3}^*$ of the first inverter and determine the duty Da1, Db1, Dc1 of the first inverter by performing the pulse width modulation based on the voltage command $V_{d,INV1}^*$, $V_{q,INV2}^*$, $V_{n,INV3}^*$ of the first inverter.

The pulse width modulator for the first inverter 1060 may apply the remote state pulse width modulation (RSPWM) configured to implement the switching using the active vector including the same common voltage so that the first inverter and the second inverter may maintain the same common voltage.

The hexagon at the bottom portion of FIG. 15 indicates the range of the first inverter voltage which may be synthesized by the active vector including the switching states of [010], [001], and [100] in the first inverter by a dotted line. Furthermore, when the voltage range of the first inverter in which the 0-phase voltage may be determined to be the same as that of the second inverter according to the active vector determined by the duty of the second inverter 20 is applied to the whole motor voltage of the first inverter and the second inverter synthesized, the motor voltage may be determined in the range within the dotted line illustrated in the uppermost hexagon in FIG. 15.

The pulse width modulator for the first inverter 1060 may determine the duty for the switching state including the same 0-phase voltage as the switching state of the second inverter so that the voltage $V_{INV1}$ of the first inverter 10 may be synthesized.

Figure 16:
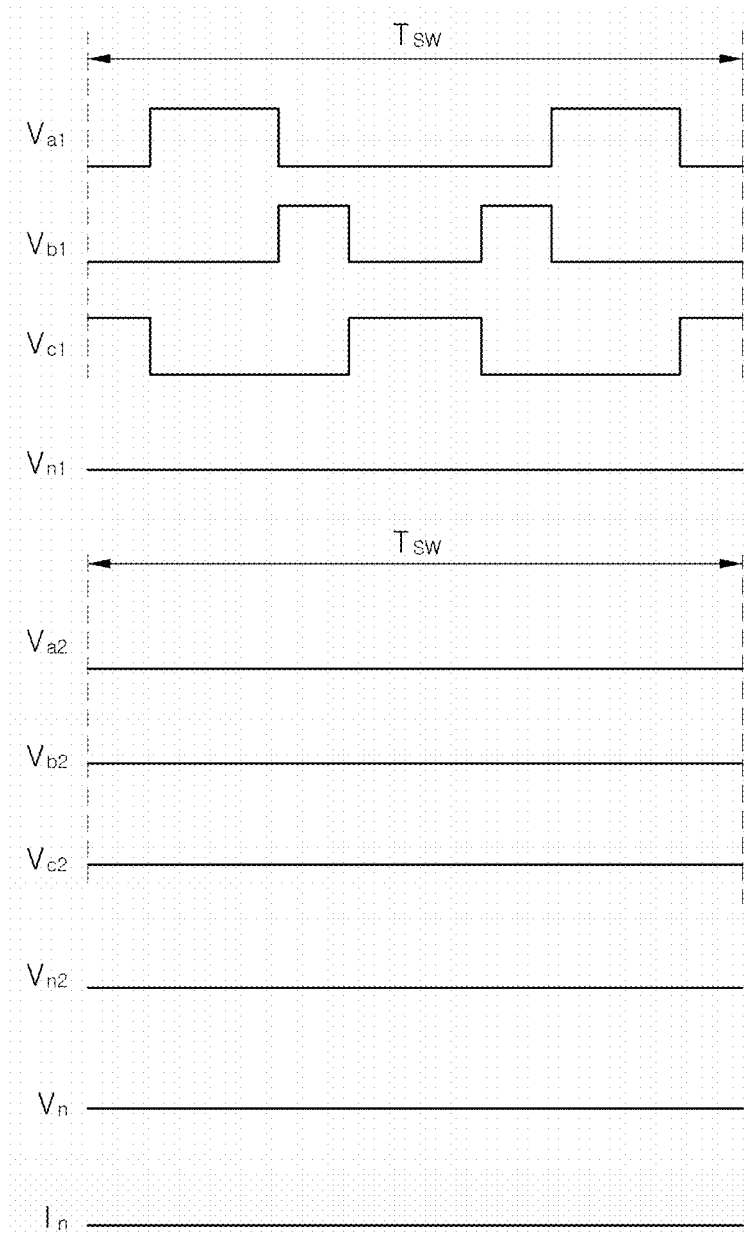
FIG. 16 is a waveform diagram illustrating a voltage output of each inverter generated by control of a motor driving apparatus according to the various exemplary embodiments of FIG. 14.

FIG. 16 is a waveform diagram illustrating a voltage output of each inverter generated by control of a motor driving apparatus according to the exemplary embodiment of FIG. 14

As illustrated in FIG. 16, it may be confirmed that the second inverter 20 maintains only the state of during one switching period $T_{sw}$ and that switching that represents [001], [100], and [010] including the same 0-phase voltage as [001] by a fixed duty is performed in the first inverter 10. It may be confirmed that, since the 0-phase voltages $V_{n1}$, $V_{n2}$ of the two inverters are the same, the 0-phase voltage $V_n$ of the entire motor driving system corresponding to the difference between the two 0-phase voltages is also 0 and that no 0-phase current $I_n$ is generated accordingly.

Figure 17:
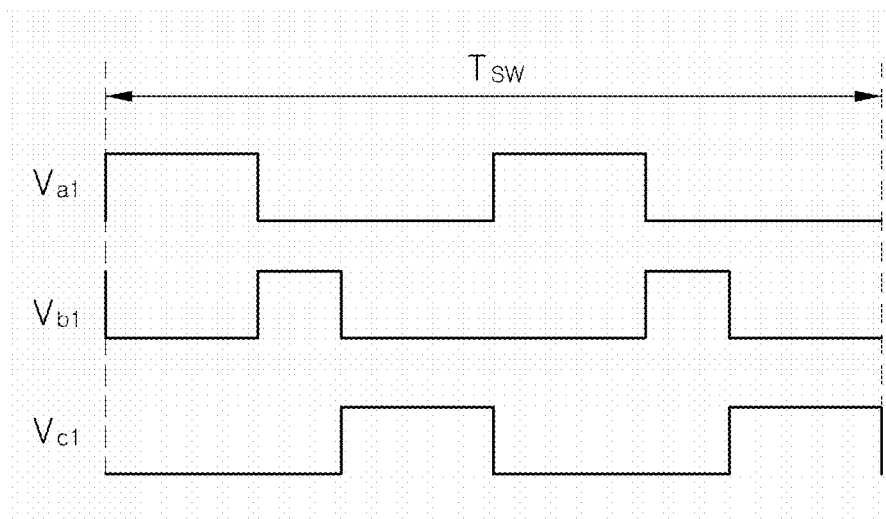
FIG. 17, FIG. 18 and FIG. 19 are waveform diagrams illustrating various methods of controlling a first inverter which may be generated by the pulse width modulator for the first inverter illustrated in FIG. 14.
Figure 18:
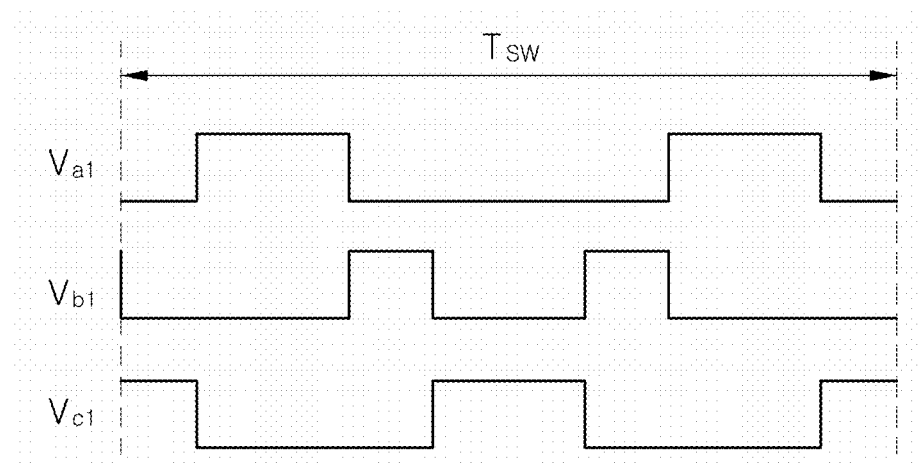
Figure 19:
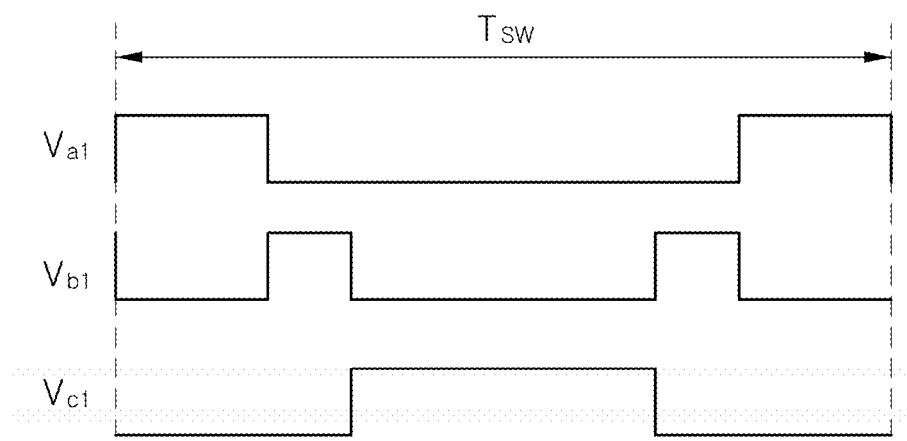

FIG. 17, FIG. 18 and FIG. 19 are waveform diagrams illustrating various methods of controlling a first inverter which may be generated by the pulse width modulator for the first inverter illustrated in FIG. 14.

The pulse width modulator for the first inverter 1060 may determine the duty of the first inverter 10 using the switching state of three active voltage vectors including the same 0-phase voltage as the duty of the second inverter 20 once the duty of the second inverter 20 is determined.

First, as illustrated in FIG. 17, the pulse width modulator for the first inverter 1060 may apply a method of switching the first switching elements S11-S16 of the first inverter 10 repeating the three determined switching states in a fixed order.

Furthermore, as illustrated in FIG. 18, the pulse width modulator for the second inverter 1060 may apply a method of distributing the three determined switching states symmetrically with respect to the midpoint of one switching period.

Furthermore, as illustrated in FIG. 19, the pulse width modulator for the second inverter 1060 may apply the method of distributing the three determined switching states symmetrically with respect to the midpoint of one switching period, but a method of reducing the switching loss by reducing the number of switching for the switching state including the longest duty to appear continuously before and after the midpoint of one switching period.

As described above, in the exemplary embodiment described through FIGS. 17 to 19, the switching of the inverter to which switching elements with a high switching loss are applied may be minimized when the switching elements forming each of the two inverters applied to the open-end winding method are different, reducing the switching losses and significantly improving the system efficiency accordingly.

According to the motor driving apparatus described thus far, the common mode voltage generated by the inverter is "0", but the common mode voltage and current actually applied to the motor 100 are not "0" due to the non-uniformity of the switching period and the back electromotive force of the motor 100. Because the current may cause a loss to the inverter and motor without significantly contributing to the torque and generate an overcurrent, the common mode current control is required to resolve the problem.

The motor driving apparatus including the controller 30 controlling the common mode current will be described in the following.

Figure 20:
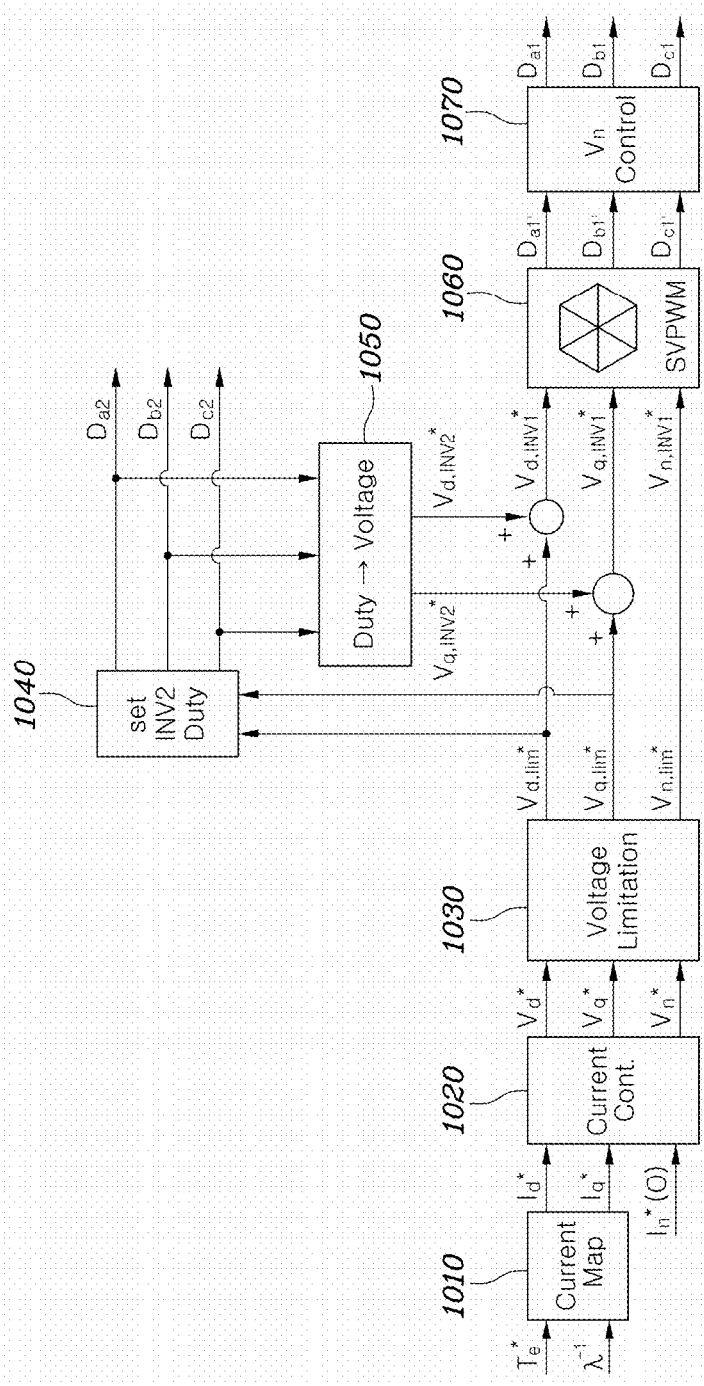
FIG. 20 is a block diagram illustrating a controller of a motor driving apparatus in detail according to various exemplary embodiments of the present disclosure.

FIG. 20 is a block diagram illustrating the controller 30 of the motor driving apparatus according to various exemplary embodiments of the present disclosure. The controller 30 of the motor driving apparatus may include a current command map 1010, a current controller 1020, a voltage limiter 1030, a duty generator for the second inverter 1040, a coordinate transformer 1050, a pulse width modulator for the first inverter 1060, and a common mode voltage controller 1070.

Because the detailed technical features of the motor driving apparatus according to FIG. 20 are the same as or similar to the technical features of the motor driving apparatus described above, a detailed description thereof will be omitted.

Figure 21:
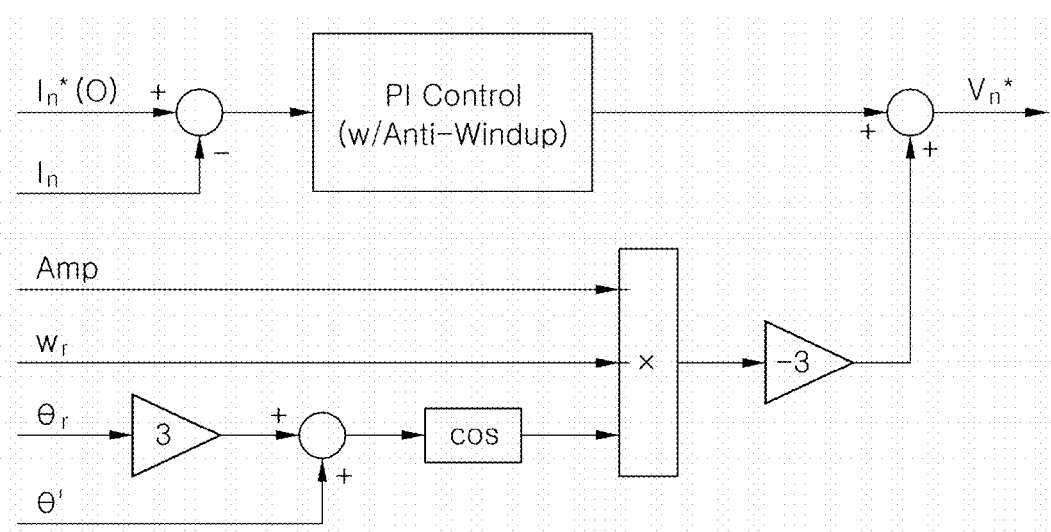
FIG. 21 is a logic circuit illustrating a common mode current control by a controller using a feed-back control and a feed-forward control methods according to FIG. 20.

FIG. 21 illustrates a logic circuit illustrating the current control of the common mode by a feed-back control and a feed-forward control method of the controller 30 according to FIG. 20. The motor 100 may be driven by switching the first switching elements S11-S16 of the first inverter 10 and the second switching elements S21-S26 of the second inverter 20 by pulse width modulation. The common mode current may generate an overcurrent by causing loss such as iron loss and copper loss of the motor 100. To suppress this, the current controller 1020 may predict a change in the control amount caused by an external disturbance and the feed-back control by which a part of the output signal is input back and control the common mode current to 0 through a feed-forward control method.

As illustrated in FIG. 20, the pulse width modulator for the first inverter 1060 may determine the duty $D_{a1}'$, $D_{b1}'$, $D_{c1}'$ of the first switching elements S11-S16 by performing pulse width modulation based on the voltage command $V_{d,INV1}^*$, $V_{q,INV2}^*$, $V_{n,INV3}^*$ of the first inverter 10 upon receiving as the voltage command $V_{d,INV1}^*$, $V_{q,INV2}^*$, $V_{n,INV3}^*$ of the first inverter 10 the value obtained by summing up the values obtained by transforming the voltage vector corresponding to the duty of the second inverter 20 into which the voltage command $V_{d,lim}^*$, $V_{n,lim}^*$ is transformed by the coordinate transformer 1050.

Next, the common mode voltage controller 1070 may adjust the duty $D_{a1}'$, $D_{b1}'$, $D_{c1}'$) of the first switching elements S11-S16 and determine the duty $D_{a1}'$, $D_{b1}'$, $D_{c1}'$) of the first switching elements S11-S16 so that the one-period average of the outputted common mode voltage matches the voltage command of common mode.

The duty of the plurality of first switching elements S11-S16, the voltage command of the common mode, and the DC voltage applied to the inverter may have a relationship expressed in FORMULA 1 below.

This is expressed in FORMULA 1 below:

$$\text{Duty}_{vn} = 1/n \times V_n^*/(-V_{dc}/n), \qquad \text{FORMULA 1:}$$

where $\text{Duty}_{vn}$ = duty of a plurality of first switching elements, $V_n^*$ = voltage command of motor, $V_{dc}$ = DC voltage applied to the first inverter and the second inverter, and n = number of switching elements forming the first inverter.

FORMULA 1 shows that the duty of the plurality of first switching elements S11-S16 may be determined to be the value obtained by dividing the voltage command of the motor 100 by the DC voltage applied to the first inverter and the second inverter regardless of the number of switching elements S11-S16 forming the first inverter 10.

On the other hand, it is known that the common mode voltage for each switching mode is determined as shown in the table below.

TABLE 1

| switching mode | common mode voltage |
| --- | --- |
| $V_0[000]$ | $-0.5 * V_{dc}$ |
| $V_1[100]$ | $-1/6 * V_{dc}$ |
| $V_2[110]$ | $1/6 * V_{dc}$ |
| $V_3[010]$ | $-1/6 * V_{dc}$ |
| $V_4[011]$ | $1/6 * V_{dc}$ |
| $V_5[001]$ | $-1/6 * V_{dc}$ |
| $V_6[101]$ | $1/6 * V_{dc}$ |
| $V_7[111]$ | $0.5 \, V_{dc}$ |

For example, when the duty or voltage command of the second inverter 20 is determined to be [001], the voltage command of the first inverter 10 may be determined using [010], [001], and [100] including the same common mode voltage as the common mode voltage according to the switching state of the second inverter 20. The pulse width modulator for the first inverter 1060 may determine the duty for the switching mode including the same common mode voltage as the switching state of the second inverter 20 to synthesize the voltage $V_{INV1}$ of the first inverter 10.

Figure 22:
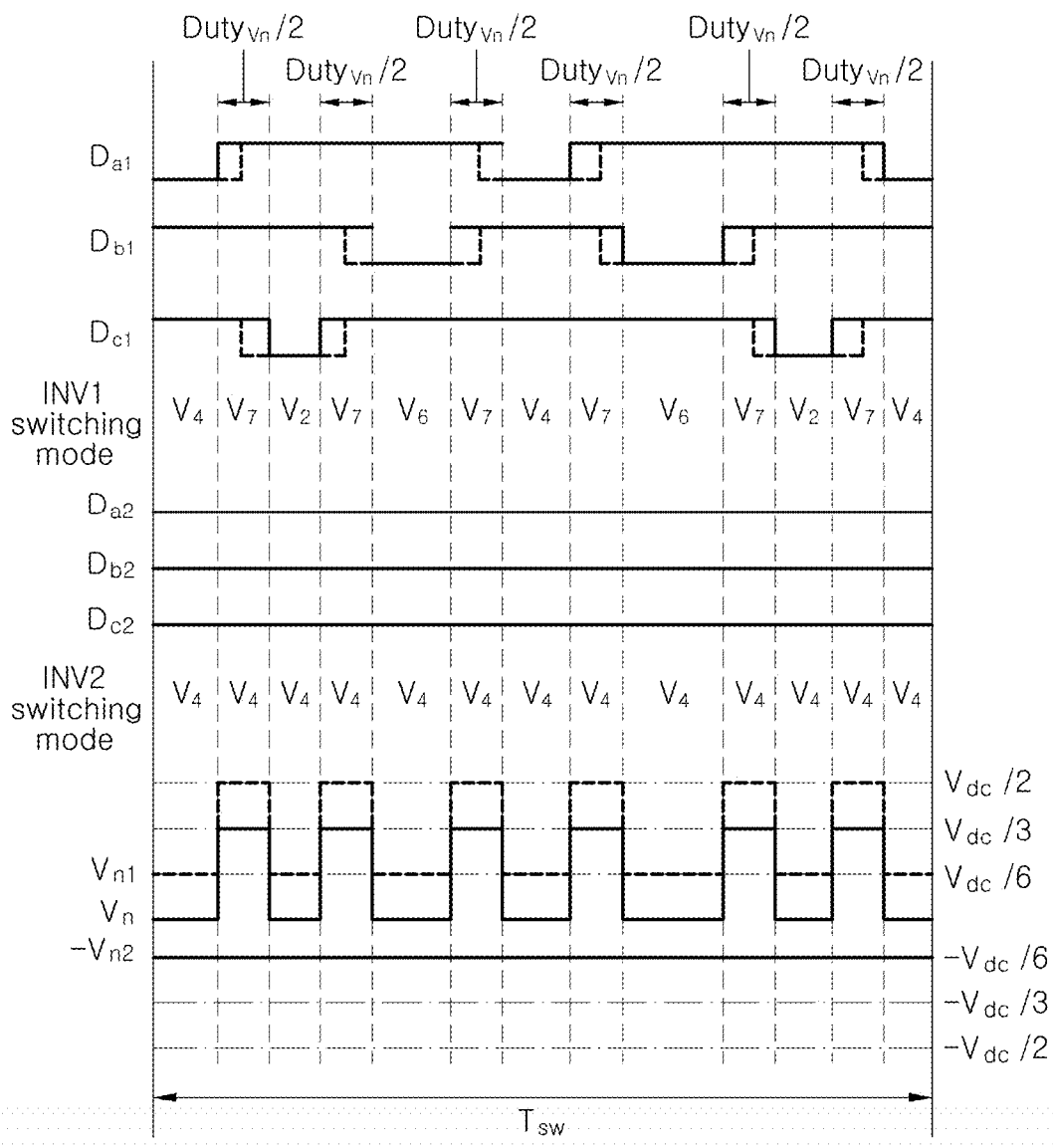
FIG. 22 is a waveform diagram illustrating a voltage output of each inverter generated by a controller according to FIG. 20.

FIG. 22 is a waveform diagram illustrating the voltage output of each inverter generated by the controller 30 according to FIG. 20. In FIG. 22, $T_{sw}$ denotes a switching period of the switching elements S11-S16, S21-S26 in the inverters, $V_{a1}$, $V_{b1}$, $V_{c1}$, $V_{n1}$ denote respective phase voltages and common mode voltage of the first inverter 10, $V_{a2}$, $V_{b2}$, $V_{c2}$, $V_{n2}$ denote respective phase voltage and common mode voltage of the second inverter 20, and $V_n$ denotes the difference between the common mode voltage of the first inverter 10 and the common mode voltage of the second inverter 20, indicating the common mode voltage applied to the motor 100 by the first inverter 10 and the second inverter 20.

An inverter output voltage waveform as illustrated in FIG. 22 may be obtained by adjusting the duty of the plurality of first switching elements S11-S16 so that the one-period average of the outputted common mode voltage matches the voltage command of the common mode. The duty $D_{a1}'$, $D_{b1}'$, $D_{c1}'$ of the plurality of first switching elements S11-S16 is adjusted while the duty $D_{a2}$, $D_{b2}$, $D_{c2}$ of the plurality of second switching elements S21-S26 is maintained. A value other than "0" of the common mode voltage is outputted in a part where the duty $Duty_{vn}$ is adjusted at the instant time. The duty adjustment amount of the plurality of first switching elements S11-S16 may be determined so that the one-period average of the outputted common mode voltage matches the voltage command of the common mode $V_n^*$ at the instant time. In the case of FIG. 22, the common mode voltage generated through duty $Duty_{vn}$ adjustment is $V_{dc}/3$, and the duty adjustment amount satisfying the voltage command $V_n^*$ of the motor 100, which is the required controller 30 output voltage, may be determined to be $Duty_{vn}=\frac{1}{3} \times V_n^*/(V_{dc}/3)$ by FORMULA 1 described above.

As a result, according to various embodiment of the present disclosure, when the motor is driven by the open-end winding method of connecting each inverter to either end of the motor winding, the motor efficiency may be improved by setting the duty of the plurality of first switching elements so that the one-period average of the common mode voltage matches the voltage command of the common mode to remove the common mode voltage and current. Furthermore, the common mode current is prevented from distorting the motor phase current, facilitating the control of motor current and preventing loss such as iron loss and copper loss of the motor caused by the circulating current in advance.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus driving a motor including a plurality of windings respectively corresponding to a plurality of phases, the apparatus comprising:
   a first inverter including a plurality of first switching elements and connected to a first end of each of the windings;
   a second inverter including a plurality of second switching elements and connected to a second end of each of the windings; and
   a controller connected to the first inverter and the second inverter and configured for determining a voltage command of the first inverter based on a voltage command of the motor and an active vector corresponding to a duty of the second switching elements and for controlling the first switching elements through pulse width modulation based on the voltage command of the first inverter,
   wherein the controller is configured to determine the active vector including a same common mode voltage as the plurality of second switching elements to be a duty of the plurality of first switching elements in the pulse width modulation of the first switching elements and to adjust the duty of the plurality of first switching elements so that one-period average of outputted common mode voltage matches a voltage command of common mode.

2. The apparatus of claim 1, wherein the controller is configured to control the first switching elements through remote state pulse width modulation (RSPWM).

3. The apparatus of claim 1, wherein the controller is configured to control the first switching elements through symmetric remote state pulse width modulation (RSPWM).

4. The apparatus of claim 1, wherein the controller is configured to determine the voltage command of the first inverter using a plurality of active vectors including the same common mode voltage as active vectors corresponding to the duty of the second switching elements.

5. The apparatus of claim 1, wherein the duty of the plurality of first switching elements, the voltage command of the common mode, and DC voltage applied to the first inverter and the second inverter have a relationship as shown in the following FORMULA 1:

$$\text{Duty}_{vn} = 1/n \times V_n^* / (V_{dc}/n), \quad \text{FORMULA 1:}$$

wherein, $\text{Duty}_{vn}$=duty of a plurality of first switching elements, $V_n^*$=voltage command of the motor, $V_{dc}$=DC voltage applied to the first inverter and the second inverter, and n=number of switching elements forming the first inverter.

6. The apparatus of claim 1, wherein the controller is configured to control the first switching elements through the pulse width modulation by a feed-back control or a feed-forward control.

7. The apparatus of claim 1, wherein the controller is configured to determine the voltage command of the first inverter using a plurality of active vectors including the same common mode voltage as the active vector corresponding to the duty of the second switching elements.

8. The apparatus of claim 7, wherein the controller is configured to switch the first switching elements so that the plurality of active vectors including the same common mode voltage as the active vector corresponding to the duty of the second switching elements repeats itself in a fixed order.

9. The apparatus of claim 7, wherein the controller is configured to switch the first switching elements so that the plurality of active vectors including the same common mode voltage as the active vector corresponding to the duty of the second switching elements appear symmetrically with respect to a midpoint of one switching period.

10. The apparatus of claim 8, wherein the controller is configured to switch the first switching elements so that a switching state including a longest duty among the plurality of active vectors including the same common mode voltage as the active vector corresponding to the duty of the second switching elements continuously appears before and after a midpoint of one switching period.

11. The apparatus of claim 1, wherein the controller is configured to determine an active vector closest to a voltage vector corresponding to the voltage command of the motor to be the duty of the second switching elements.

12. The apparatus of claim 11, wherein the controller is configured to generate a 3-phase voltage command by transforming the voltage command of the motor in reverse rotation and to determine the active vector closest to the voltage vector corresponding to the voltage command of the motor to be the duty of the second switching elements based on the 3-phase voltage command.

13. The apparatus of claim 1, wherein the controller is configured to determine the voltage command of the first inverter by adding a result of rotation transformation of an active vector corresponding to the duty of the first switching elements and the active vector corresponding to the duty of the second switching element to the voltage command of the motor.

14. The apparatus of claim 1, wherein the controller is configured to limit the voltage command of the motor to an upper limit and a lower limit.

* * * * *